United States Patent
Wu et al.

(10) Patent No.: US 10,951,746 B2
(45) Date of Patent: Mar. 16, 2021

(54) METHOD AND DEVICE IN UE AND BASE STATION USED FOR WIRELESS COMMUNICATION

(71) Applicant: SHANGHAI LANGBO COMMUNICATION TECHNOLOGY COMPANY LIMITED, Shanghai (CN)

(72) Inventors: KeYing Wu, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 15 days.

(21) Appl. No.: 16/407,187

(22) Filed: May 9, 2019

(65) Prior Publication Data
US 2019/0349457 A1 Nov. 14, 2019

(30) Foreign Application Priority Data

May 11, 2018 (CN) .......................... 201810449205.6
Jun. 11, 2018 (CN) .......................... 201810593400.6

(51) Int. Cl.
*H04L 29/08* (2006.01)
*H04W 72/04* (2009.01)
*H04L 1/00* (2006.01)
*H04W 84/04* (2009.01)

(52) U.S. Cl.
CPC .......... *H04L 69/324* (2013.01); *H04L 1/0057* (2013.01); *H04L 1/0061* (2013.01); *H04W 72/0446* (2013.01); *H04W 84/042* (2013.01)

(58) Field of Classification Search
CPC ....... H04L 1/00; H04L 1/0041; H04L 1/0057; H04L 1/0061; H04L 69/324; H04W 72/0446; H04W 84/042
See application file for complete search history.

(56) References Cited

U.S. PATENT DOCUMENTS

2004/0228320 A1* 11/2004 Laroia ................... H04L 1/1671
370/349
2016/0261283 A1* 9/2016 Myung ............... H03M 13/618

* cited by examiner

*Primary Examiner* — Minh Trang T Nguyen
(74) *Attorney, Agent, or Firm* — Maschoff Brennan

(57) ABSTRACT

The present disclosure provides a method and a device in a User Equipment (UE) and a base station for wireless communication. A first node transmits a first radio signal in a first time window, the first time window is any one time window of M time windows, the first radio signal carries a first check bit block. Herein, an information bit block corresponding to the first check bit block comprises a first bit block; values of bits comprised in the first check bit block are related to a position of the first time window in the M time windows, or, a total number of bits comprised in the first check bit block is or isn't related to a position of the first time window in the M time windows, the M is a positive integer greater than 1. The method improves precision of error correction without increasing redundancy.

20 Claims, 26 Drawing Sheets

METHOD AND DEVICE IN UE AND BASE STATION USED FOR WIRELESS COMMUNICATION

CROSS-REFERENCE TO RELATED APPLICATION

This application claims the priority benefit of Chinese Patent Application Serial Number 201810449205.6, filed on May 11, 2018, and Chinese Patent Application Serial Number 201810593400.6, filed on Jun. 11, 2018, the full disclosure of which is incorporated herein by reference.

BACKGROUND

Technical Field

The present disclosure relates to methods and devices in wireless communication systems, and in particular to a method and a device in a wireless communication system of Cyclic Redundancy Check (CRC).

Related Art

Cyclic Redundancy Check (CRC) is a hash function that generates short and fixed-digit CRC codes based on data such as network packet or computer files. CRC is mainly used for detecting or checking errors possibly occurred after data transmission or data storage, and it performs error detection using the general division and the remainder theorem. In traditional Long Term Evolution (LTE) system, CRC has specific functions of error check and target receiver identification.

In 5G systems, in order to meet varied performance requirements posed by diversified application scenarios, Ultra-Reliable and Low Latency Communications (URLLC) becomes one of three major application scenarios in New Radio (NR) system. In URLLC, a typical scenario is presented by smaller quantity of data transmitted each time, and higher demand on transmission defer and transmission reliability. According to discussions of $3^{rd}$ Generation Partner Project (3GPP) Radio Access Network (RAN) 1, URLLC transmission will support repetition as a transmission method to enhance transmission reliability.

SUMMARY

The inventors have found through researches that in order to meet the requirement of URLLC for high reliability, the precision of error check on URLLC transmission must be very high. However, the precision of error check provided by a maximum number of CRC bits that the present system can support is not always sufficient for reliability required by URLLC. Since the amount of information transmitted by URLLC each time is smaller, a redundancy further caused by an increasing number of CRC bits will remarkably reduce transmission efficiency. Therefore, how to improve error check precision of URLLC without rising excessive redundancy has been a problem needed to be solved.

In view of the above problem, the present disclosure provides a solution. It should be noted that though originally targeted at URLLC, the present disclosure is also applicable to other business types and application scenarios. The embodiments of a first node in the present disclosure and the characteristics in the embodiments may be applied to a second node if no conflict is incurred, and vice versa. The embodiments of the present disclosure and the characteristics in the embodiments may be mutually combined if no conflict is incurred.

The present disclosure provides a method in a first node for wireless communication, comprising:

transmitting a first radio signal in a first time window, the first time window is any time window out of M time windows, the first radio signal carries a first check bit block;

wherein an information bit block corresponding to the first check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

In one embodiment, a problem needed to be solved in the present disclosure is how to improve the precision of error check for URLLC without increasing total amount of CRC bits. The above method solves this problem by generating different check bit blocks for the first bit block in separate time windows of the M time windows.

In one embodiment, the above method is characterized in that the first node transmits radio signals generated by the first bit block in each time window of the M time windows, but generates check bit blocks for the first bit block using different CRC Cyclic Generator Polynomials in different time windows. An advantage of the above method is that check bit blocks in different time windows can be jointly used for error check for the first bit block, which is equivalent to increasing a total number of effective CRC bits, thus enhancing precision of error check for the first bit block. In the meanwhile, there is no increase in the number of CRC bits in actual transmission, hence the avoidance of excessive redundancy.

According to one aspect of the present disclosure, comprising:

transmitting a second radio signal in a second time window, the second time window is any time window out of M1 time window(s), the second radio signal carries the first bit block;

wherein the M1 time window(s) is(are) a subset of the M time windows, the M1 is a positive integer not greater than the M.

According to one aspect of the present disclosure, wherein the second radio signal carries a second bit block and a third check bit block, an information bit block corresponding to the third check bit block comprises the second bit block, the first check bit block is not related to the second bit block.

According to one aspect of the present disclosure, wherein a bit block output after the first bit block is subjected to a first coding is used for generating the second radio signal, a code rate of the first coding is related to a position of the second time window in the M1 time window(s).

In one embodiment, the above method is advantageous in that a total number of bits output from the first coding is not related to the length of check bit block of the first bit block in the second time window, which prevents impacts on resources allocation and resources mapping caused by utilizing different numbers of CRC bits in different time windows of the M time windows, thus reducing complexity of practice.

In one embodiment, the above method is advantageous in that in a time window with lower number of CRC bits, a code rate of channel coding will be lower, so that transmission reliability for radio signals in these time windows will be higher. A target receiver of the first radio signal can correctly recover the first bit block out of radio signals received within these time windows, so as to recover a check bit block of the first bit block, for example, the first check bit block, subsequently.

According to one aspect of the present disclosure, wherein a first post-coding bit block is acquired after a third coding of a first pre-coding bit block, the first pre-coding bit block comprises the first bit block and the first check bit block, the first post-coding bit block comprises a first post-coding bit sub-block and a second post-coding bit sub-block; the first check bit block comprises a first check bit sub-block and a second check bit sub-block, the first post-coding bit sub-block is not related to the second check bit sub-block; the first post-coding bit sub-block and the second post-coding bit sub-block are used for generating the first radio signal and the second radio signal respectively.

According to one aspect of the present disclosure, wherein the M1 is less than the M, the first node only transmits a radio signal carrying the first bit block in the M1 time window(s) out of the M time windows.

According to one aspect of the present disclosure, wherein if the first time window is a time window out of M2 time window(s), a first generation polynomial is used for generating the first check bit block; if the first time window is a time window out of M3 time window(s), a second generation polynomial is used for generating the first check bit block; the M2 time window(s) and the M3 time window(s) are two subsets of the M time windows not intersected with each other, the M2 and the M3 are positive integers less than the M, respectively.

In one embodiment, the above method is advantageous in that different CRC Cyclic Generator Polynomials are used for generating CRC bits in different time windows of the M time windows, which increases effective/workable CRC length and improves precision of error check for the first bit block.

According to one aspect of the present disclosure, wherein the first check bit block comprises Q check bit sub-block(s), an information bit block corresponding to each Check bit sub-block out of the Q check bit sub-block(s) comprises the first bit block; the Q is a positive integer.

According to one aspect of the present disclosure, comprising:
repeatedly transmitting K radio signal group(s) in K time resource group(s) respectively;
wherein any time resource group of the K time resource group(s) comprises a positive integer number of time window(s), any radio signal group of the K radio signal group(s) comprises a positive integer number of radio signal(s), the M time windows are a time resource group of the K time resource group(s); the K is a positive integer.

According to one aspect of the present disclosure, comprising:
receiving first information, or transmitting first information;
wherein the first information is used for determining the K time resource group(s).

According to one aspect of the present disclosure, comprising:
receiving second information, or transmitting second information;
wherein the second information is used for determining at least one of the M and the M1.

According to one aspect of the present disclosure, wherein the first node is a User Equipment (UE); or, the first node is a base station.

The present disclosure provides a method in a second node for wireless communication, comprising:
receiving a first radio signal in a first time window, the first time window is any time window out of M time windows, the first radio signal carries a first check bit block;
wherein an information bit block corresponding to the first check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

According to one aspect of the present disclosure, comprising:
transmitting a second radio signal in a second time window, the second time window is any time window out of M1 time window(s), the second radio signal carries the first bit block;
wherein the M1 time window(s) is(are) a subset of the M time windows, the M1 is a positive integer not greater than the M.

According to one aspect of the present disclosure, wherein the second radio signal carries a second bit block and a third check bit block, an information bit block corresponding to the third check bit block comprises the second bit block, the first check bit block is not related to the second bit block.

According to one aspect of the present disclosure, wherein a first post-coding bit block is acquired after a third coding of a first pre-coding bit block, the first pre-coding bit block comprises the first bit block and the first check bit block, the first post-coding bit block comprises a first post-coding bit sub-block and a second post-coding bit sub-block, the first check bit block comprises a first check bit sub-block and a second check bit sub-block, the first post-coding bit sub-block is not related to the second check bit sub-block, the first post-coding bit sub-block and the second post-coding bit sub-block are used for generating the first radio signal and the second radio signal respectively.

According to one aspect of the present disclosure, wherein the M1 is less than the M, the second node only receives a radio signal carrying the first bit block in the M1 time window(s) out of the M time windows.

According to one aspect of the present disclosure, wherein if the first time window is a time window out of M2 time window(s), a first generation polynomial is used for generating the first check bit block; if the first time window is a time window out of M3 time window(s), a second generation polynomial is used for generating the first check bit block; the M2 time window(s) and the M3 time window(s) are two subsets of the M time windows not intersected with each other, the M2 and the M3 are positive integers less than the M, respectively.

According to one aspect of the present disclosure, wherein the first check bit block comprises Q check bit sub-block(s), an information bit block corresponding to each Check bit sub-block of the Q check bit sub-block(s) comprises the first bit block, the Q is a positive integer.

According to one aspect of the present disclosure, comprising:
receiving repeatedly transmitted K radio signal group(s) in K time resource group(s) respectively;

wherein any time resource group of the K time resource group(s) comprises a positive integer number of time window(s), any radio signal group of the K radio signal group(s) comprises a positive integer number of radio signal(s), the M time windows are a time resource group of the K time resource group(s), the K is a positive integer.

According to one aspect of the present disclosure, comprising:

transmitting first information, or receiving first information;

wherein the first information is used for determining the K time resource group(s).

According to one aspect of the present disclosure, comprising:

transmitting second information, or receiving second information;

wherein the second information is used for determining at least one of the M and the M1.

According to one aspect of the present disclosure, wherein the second node is a base station; or, the second node is a UE.

The present disclosure provides a device in a first node for wireless communication, comprising:

A first processor, transmitting a first radio signal in a first time window, the first time window is any time window out of M time windows, the first radio signal carries a first check bit block;

wherein an information bit block corresponding to the first Check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

In one embodiment, the above device in a first node for wireless communication is characterized in that the first processor transmits a second radio signal in a second time window, the second time window is any time window out of the M1 time window(s), the second radio signal carries the first bit block; wherein the M1 time window(s) is(are) a subset of the M time windows, the M1 is a positive integer not greater than the M.

In one embodiment, the above device in a first node for wireless communication is characterized in that the second radio signal carries a second bit block and a third check bit block, an information bit block corresponding to the third check bit block comprises the second bit block, the first check bit block is not related to the second bit block.

In one embodiment, the above device in a first node for wireless communication is characterized in that a bit block output after the first bit block is subjected to a first coding is used for generating the second radio signal, a code rate of the first coding is related to a position of the second time window in the M1 time window(s).

In one embodiment, the above device in a first node for wireless communication is characterized in that a first post-coding bit block is acquired after a third coding of a first pre-coding bit block, the first pre-coding bit block comprises the first bit block and the first check bit block, the first post-coding bit block comprises a first post-coding bit sub-block and a second post-coding bit sub-block, the first check bit block comprises a first check bit sub-block and a second check bit sub-block, the first post-coding bit sub-block is not related to the second check bit sub-block, the first post-coding bit sub-block and the second post-coding bit sub-block are used for generating the first radio signal and the second radio signal respectively.

In one embodiment, the above device in a first node for wireless communication is characterized in that the M1 is less than the M, the first processor only transmits a radio signal carrying the first bit block in the M1 time window(s) out of the M time windows.

In one embodiment, the above device in a first node for wireless communication is characterized in that if the first time window is a time window out of M2 time window(s), a first generation polynomial is used for generating the first check bit block; if the first time window is a time window out of M3 time window(s), a second generation polynomial is used for generating the first check bit block; the M2 time window(s) and the M3 time window(s) are two subsets of the M time windows not intersected with each other, the M2 and the M3 are positive integers less than the M, respectively.

In one embodiment, the above device in a first node for wireless communication is characterized in that the first check bit block comprises Q check bit sub-block(s), an information bit block corresponding to each check bit sub-block out of the Q check bit sub-block(s) comprises the first bit block; the Q is a positive integer.

In one embodiment, the above device in a first node for wireless communication is characterized in that the first processor repeatedly transmits K radio signal group(s) in K time resource group(s) respectively; wherein any time resource group of the K time resource group(s) comprises a positive integer number of time window(s), any radio signal group of the K radio signal group(s) comprises a positive integer number of radio signal(s); the M time windows are a time resource group of the K time resource group(s); the K is a positive integer.

In one embodiment, the above device in a first node for wireless communication is characterized in that the first processor receives first information; wherein the first information is used for determining the K time resource group(s).

In one embodiment, the above device in a first node for wireless communication is characterized in that the first processor transmits first information; wherein the first information is used for determining the K time resource group(s).

In one embodiment, the above device in a first node for wireless communication is characterized in that the first processor receives second information; wherein the second information is used for determining at least one of the M and the M1.

In one embodiment, the above device in a first node for wireless communication is characterized in that the first processor transmits second information; wherein the second information is used for determining at least one of the M and the M1.

In one embodiment, the above device in a first node for wireless communication is characterized in that a device in the first node is a UE.

In one embodiment, the above device in a first node for wireless communication is characterized in that a device in the first node is a base station.

The present disclosure provides a device in a second node for wireless communication, comprising:

a second processor, receiving a first radio signal in a first time window, the first time window is any time window out of M time windows, the first radio signal carries a first check bit block;

wherein an information bit block corresponding to the first Check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

In one embodiment, the above device in a second node for wireless communication is characterized in that the second processor receives a second radio signal in a second time window, the second time window is any time window out of M1 time window(s), the second radio signal carries the first bit block; wherein the M1 time window(s) is(are) a subset of the M time windows, the M1 is a positive integer not greater than the M.

In one embodiment, the above device in a second node for wireless communication is characterized in that the second radio signal carries a second bit block and a third check bit block, an information bit block corresponding to the third check bit block comprises the second bit block, the first check bit block is not related to the second bit block.

In one embodiment, the above device in a second node for wireless communication is characterized in that a bit block output after the first bit block is subjected to a first coding is used for generating the second radio signal, a code rate of the first coding is related to a position of the second time window in the M1 time window(s).

In one embodiment, the above device in a second node for wireless communication is characterized in that a first post-coding bit block is acquired after a third coding of a first pre-coding bit block, the first pre-coding bit block comprises the first bit block and the first check bit block, the first post-coding bit block comprises a first post-coding bit sub-block and a second post-coding bit sub-block, the first check bit block comprises a first check bit sub-block and a second check bit sub-block, the first post-coding bit sub-block is not related to the second check bit sub-block, the first post-coding bit sub-block and the second post-coding bit sub-block are used for generating the first radio signal and the second radio signal respectively.

In one embodiment, the above device in a second node for wireless communication is characterized in that the M1 is less than the M, the second processor only receives a radio signal carrying the first bit block in the M1 time window(s) out of the M time windows.

In one embodiment, the above device in a second node for wireless communication is characterized in that if the first time window is a time window out of M2 time window(s), a first generation polynomial is used for generating the first check bit block; if the first time window is a time window out of M3 time window(s), a second generation polynomial is used for generating the first check bit block; the M2 time window(s) and the M3 time window(s) are two subsets of the M time windows not intersected with each other, the M2 and the M3 are positive integers less than the M, respectively.

In one embodiment, the above device in a second node for wireless communication is characterized in that the first check bit block comprises Q check bit sub-block(s), an information bit block corresponding to each check bit sub-block of the Q check bit sub-block(s) comprises the first bit block, the Q is a positive integer.

In one embodiment, the above device in a second node for wireless communication is characterized in that the second processor receives repeatedly transmitted K radio signal group(s) in K time resource group(s) respectively; wherein any time resource group of the K time resource group(s) comprises a positive integer number of time window(s), any radio signal group of the K radio signal group(s) comprises a positive integer number of radio signal(s), the M time windows are a time resource group of the K time resource group(s); the K is a positive integer.

In one embodiment, the above device in a second node for wireless communication is characterized in that the second processor transmits first information; wherein the first information is used for determining the K time resource group(s).

In one embodiment, the above device in a second node for wireless communication is characterized in that the second processor receives first information; wherein the first information is used for determining the K time resource group(s).

In one embodiment, the above device in a second node for wireless communication is characterized in that the second processor transmits second information, wherein the second information is used for determining at least one of the M and the M1.

In one embodiment, the above device in a second node for wireless communication is characterized in that the second processor receives second information, wherein the second information is used for determining at least one of the M and the M1.

In one embodiment, the above device in a second node for wireless communication is characterized in that the second node is a base station.

In one embodiment, the above device in a second node for wireless communication is characterized in that the second node is a UE.

In one embodiment, the present disclosure has the following advantages over conventional schemes:

When a same piece of data is transmitted multiple times, various methods may be employed in these transmissions to generate check bit blocks, for example, different CRC Cyclic Generator Polynomials or CRC lengths. When performing error check, check bit blocks in multiple transmissions can be used in combination, which is equivalent to increasing a total number of effective CRC bits, thereby enhancing precision of error check without increasing redundancy.

BRIEF DESCRIPTION OF THE DRAWINGS

Other features, objects and advantages of the present disclosure will become more apparent from the detailed description of non-restrictive embodiments taken in conjunction with the following drawings.

EMBODIMENT 1

Figure 1:
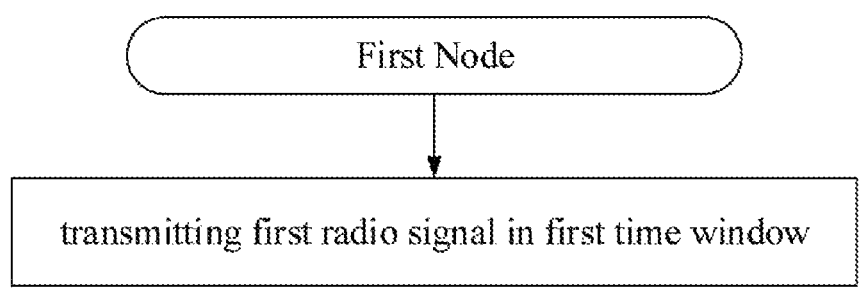
FIG. 1 illustrates a flowchart of a first radio signal according to one embodiment of the present disclosure.

Embodiment 1 illustrates a flowchart of a first radio signal; as shown in FIG. 1.

In Embodiment 1, the first node in the present disclosure transmits a first radio signal in a first time window, the first time window is any time window out of M time windows, the first radio signal carries a first check bit block. Herein, an information bit block corresponding to the first check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

In one embodiment, values of bits comprised in the first check bit block are related to a position of the first time window in the M time windows, and a total number of bits comprised in the first check bit block is related to a position of the first time window in the M time windows.

In one embodiment, values of bits comprised in the first check bit block are related to a position of the first time window in the M time windows.

In one embodiment, a total number of bits comprised in the first check bit block is related to a position of the first time window in the M time windows.

In one embodiment, the M is equal to 2.

In one embodiment, the M is greater than 2.

In one embodiment, the first check bit block comprises a positive integer number of bit(s).

In one embodiment, the first bit block comprises a positive integer number of bit(s).

In one embodiment, all bits in the first check bit block are arranged in sequence.

In one embodiment, all bits in the first bit block are arranged in sequence.

In one embodiment, the first bit block comprises at least one of downlink data and downlink control information, the first node is a base station.

In one embodiment, the first bit block comprises at least one of uplink data and uplink control information, the first node is a UE.

In one embodiment, an information bit block corresponding to the first check bit block is the first bit block.

In one embodiment, the first check bit block is generated by a Cyclic Redundancy Check (CRC) bit block of the first bit block.

In one embodiment, an information bit block corresponding to the first check bit block comprises the first bit block and a second check bit block, an information bit block corresponding to the second check bit block is the first bit block.

In one embodiment, the first check bit block is generated by a check bit block of the first bit block and a second check bit block, an information bit block corresponding to the second check bit block is the first bit block.

In one embodiment, the first radio signal carries the first bit block.

In one embodiment, the first radio signal does not carry the first bit block.

EMBODIMENT 2

Figure 2:
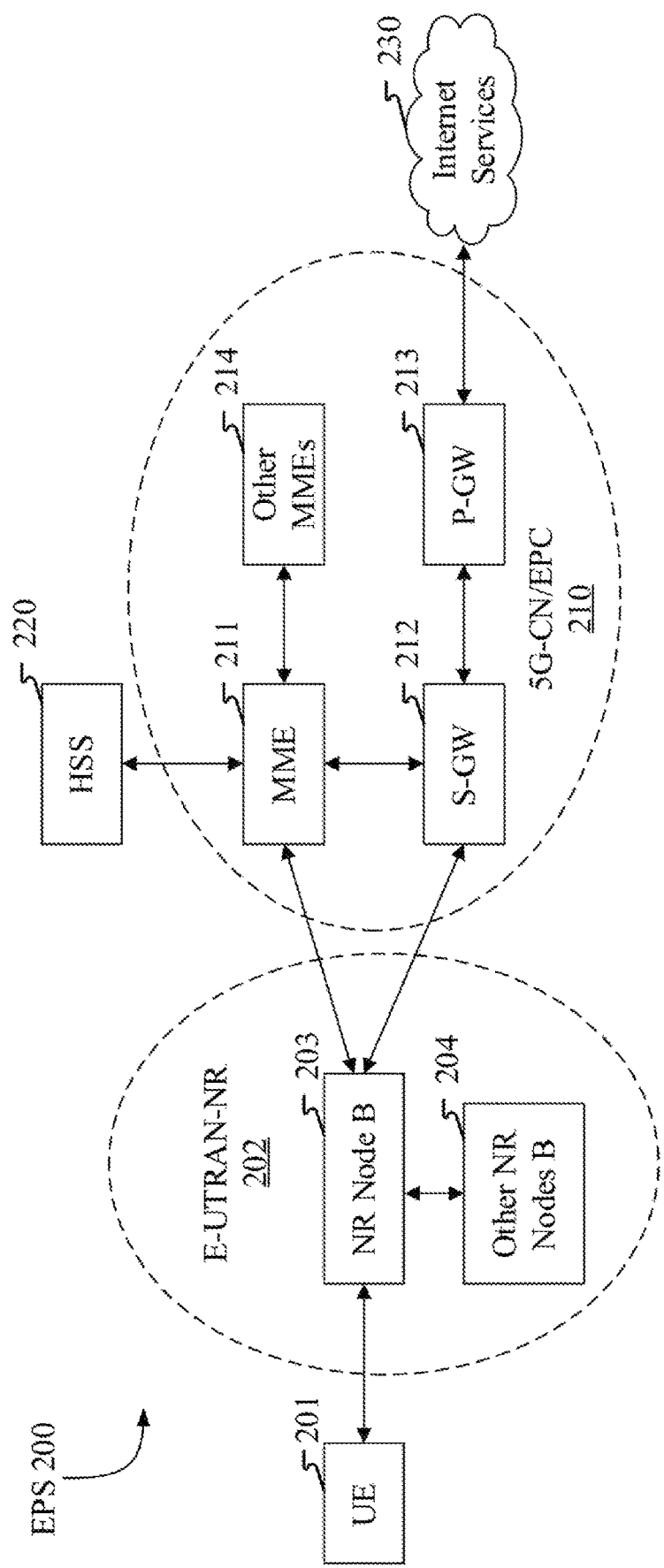
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and NR 5G systems. The LTE network architecture 200 may be called an Evolved Packet System (EPS) 200. The EPS 200 may comprise one or more UEs 201, an E-UTRAN-NR 202, a 5G-Core Network/Evolved Packet Core (EPC/5G-CN) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201 oriented user plane and control plane terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BBS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an 51 interface. The 5G-CN/EPC 210 comprises an MME 211, other MMES 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Streaming Services (PSSs).

In one embodiment, the gNB 203 corresponds to a first node in the present disclosure, the UE 201 corresponds to the second node in the present disclosure.

In one embodiment, the gNB 203 corresponds to a second node in the present disclosure, the UE 201 corresponds to the first node in the present disclosure.

EMBODIMENT 3

Figure 3:
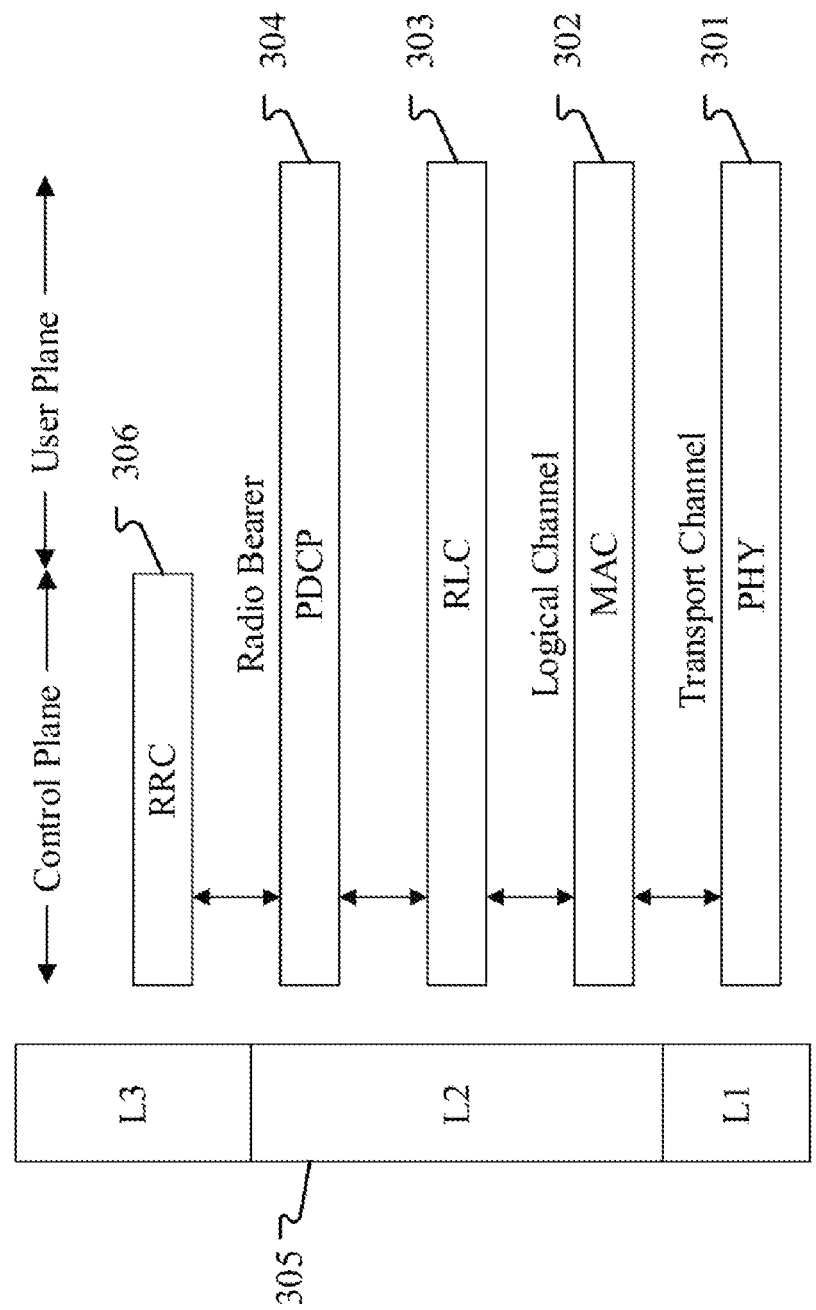
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first radio signal in the present disclosure is generated by the PHY 301.

In one embodiment, the bit block in the present disclosure is generated by the RRC sublayer 306.

In one embodiment, the first bit block in the present disclosure is generated by the MAC sublayer 302.

In one embodiment, the first bit block in the present disclosure is generated by the PHY 301.

In one embodiment, the first check bit block in the present disclosure is generated by the PHY 301.

In one embodiment, the second radio signal in the present disclosure is generated by the PHY 301.

In one embodiment, any radio signal out of the K radio signal group(s) in the present disclosure is generated by the PHY 301.

In one embodiment, the first information in the present disclosure is generated by the RRC sublayer 306.

In one embodiment, the first information in the present disclosure is generated by the MAC sublayer 302.

In one embodiment, the second information in the present disclosure is generated by the RRC sublayer 306.

In one embodiment, the second information in the present disclosure is generated by the MAC sublayer 302.

In one embodiment, the second information in the present disclosure is generated by the PHY 301.

EMBODIMENT 4

Figure 4:
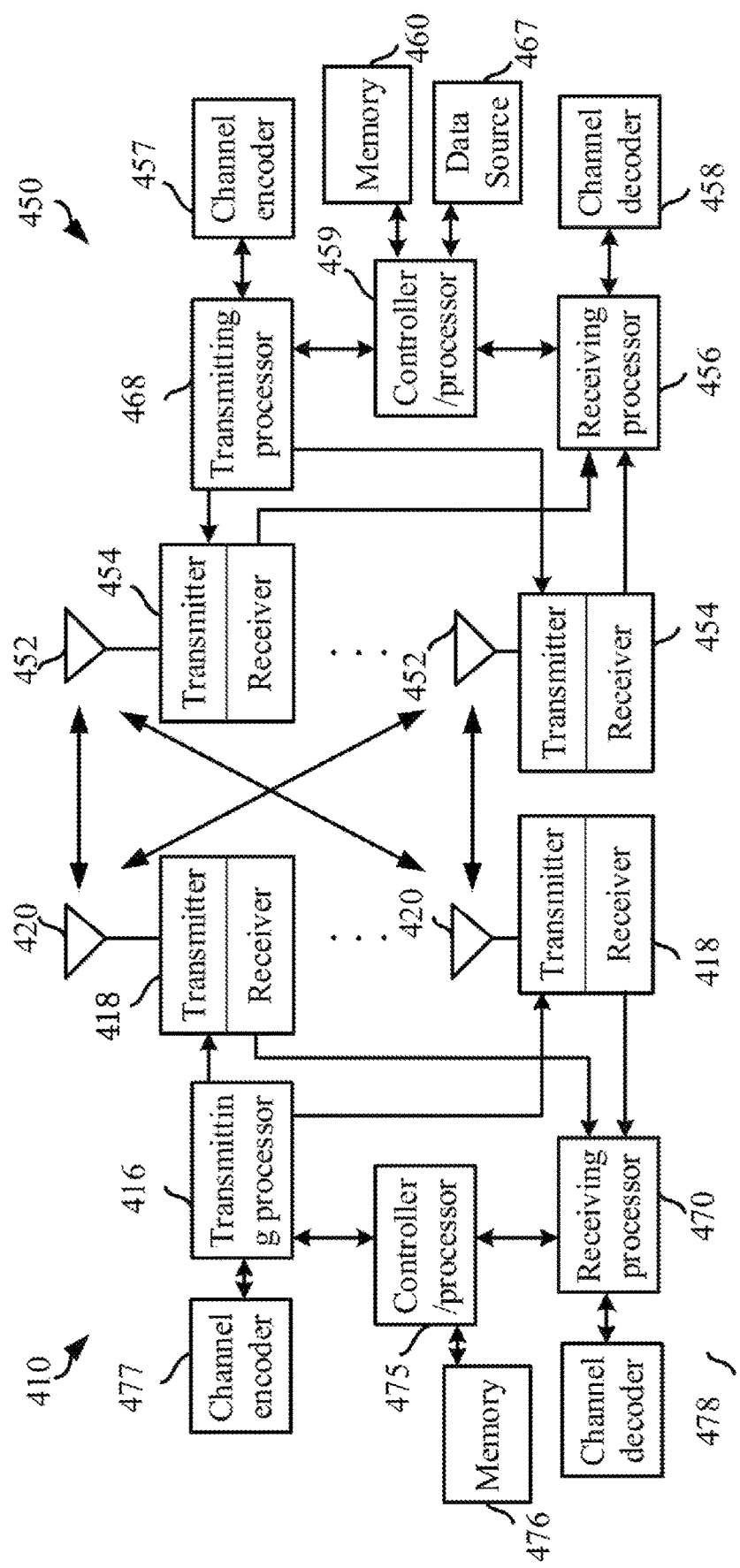
FIG. 4 illustrates a schematic diagram of a New Radio (NR) node and a UE according to one embodiment of the present disclosure.

Embodiment 4 illustrates a schematic diagram of a New Radio (NR) node and a UE, as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a channel encoder 477, a channel decoder 478, a transmitter/receiver 418 and an antenna 420.

The UE 450 comprises a controller/processor 459, a memory 460, a data source 467, a transmitting processor 468, a receiving processor 456, a channel encoder 457, a channel decoder 458, a transmitter/receiver 454 and an antenna 452.

In downlink (DL) transmission, at the gNB 410, a higher-layer packet from a core network is provided to the controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE450. The transmitting processor 416 and the channel encoder 477 perform signal processing functions used for the L1 layer (that is, PHY). The channel encoder 477 performs coding and interleaving so as to ensure an FEC (Forward Error Correction) at the UE 450 side. The transmitting processor 416 implements the mapping to signal clusters corresponding to each modulation scheme (i.e., BPSK, QPSK, M-PSK, M-QAM, etc.) and performs spatial precoding/beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. Each transmitter 418 converts a baseband multicarrier symbol stream provided by the transmitting processor 416 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the channel decoder 458 perform radio processing functions of the L1 layer. The receiving processor 456 converts the baseband multicarrier symbol stream from time domain into frequency domain using FFT. In frequency domain, a physical layer data signal and a reference signal are de-multiplexed by the receiving processor 456, wherein a reference signal is used for channel estimation, while physical layer data is subjected to multi-antenna detection in the receiving processor 456 to recover any UE 450-targeted spatial stream. Symbols on each spatial stream are demodulated and recovered in the receiving processor 456 to generate a soft decision. Then the channel decoder 458 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink transmission, the controller/processor provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The channel encoder 457 performs channel coding. Encoded data is modulated into multicarrier/single-carrier symbol streams through modulation and multi-antenna spatial precoding/beamforming performed by the transmitting processor 468, and then modulated symbol streams are provided from the transmitters 454 to each antenna 452. Each transmitter 454 first converts a baseband symbol stream provided by the transmitting processor 468 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the receiving processor 470. The receiving processor 470 and the channel decoder 478 jointly provide functions of the L1 layer. The controller/processor 475 provides functions of the L2 layer. The controller/processor 475 can be connected with the memory 476 that stores program code and data. The memory 476 can be called a computer readable medium. In UL transmission, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory includes computer program codes. The at least one memory and the computer program codes are configured to be used in collaboration with the at least one processor. The UE 450 at least receives the first radio signal of the present disclosure in the first time window of the present disclosure, the first time window is any time window out of M time windows, the first radio signal carries a first check bit block. Herein an information bit block corresponding to the first check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

In one embodiment, the UE 450 comprises a memory that stores a computer readable instruction program. The computer readable instruction program generates an action when executed by at least one processor. The action includes: receiving the first radio signal of the present disclosure in the first time window of the present disclosure, the first time window is any time window out of M time windows, the first radio signal carries a first check bit block. Herein an information bit block corresponding to the first check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

In one embodiment, the gNB 410 comprises at least one processor and at least one memory. The at least one memory includes computer program codes. The at least one memory and the computer program codes are configured to be used in collaboration with the at least one processor. The gNB 410 at least transmits the first radio signal of the present disclosure in the first time window of the present disclosure, the first time window is any time window out of M time windows, the first radio signal carries a first check bit block. Herein an information bit block corresponding to the first check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

In one embodiment, the gNB 410 comprises a memory that stores a computer readable instruction program. The computer readable instruction program generates an action when executed by at least one processor. The action includes: transmitting the first radio signal of the present disclosure in the first time window of the present disclosure, the first time window is any time window out of M time windows, the first radio signal carries a first check bit block. Herein an information bit block corresponding to the first check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

In one embodiment, the UE 450 comprises at least one processor and at least one memory. The at least one memory includes computer program codes. The at least one memory and the computer program codes are configured to be used in collaboration with the at least one processor. The UE 450 at least transmits the first radio signal of the present disclosure in the first time window of the present disclosure, the first time window is any time window out of M time windows, the first radio signal carries a first check bit block. Herein an information bit block corresponding to the first check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

In one embodiment, the UE 450 comprises a memory that stores a computer readable instruction program. The computer readable instruction program generates an action when executed by at least one processor. The action includes: transmitting the first radio signal of the present disclosure in the first time window of the present disclosure, the first time window is any time window out of M time windows, the first radio signal carries a first check bit block. Herein an information bit block corresponding to the first check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

In one embodiment, the gNB 410 comprises at least one processor and at least one memory. The at least one memory includes computer program codes. The at least one memory and the computer program codes are configured to be used in collaboration with the at least one processor. The gNB 410 at least receives the first radio signal of the present disclosure in the first time window of the present disclosure, the first time window is any time window out of M time windows, the first radio signal carries a first check bit block. Herein an information bit block corresponding to the first check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

In one embodiment, the gNB 410 comprises a memory that stores a computer readable instruction program. The computer readable instruction program generates an action when executed by at least one processor. The action includes: receiving the first radio signal of the present disclosure in the first time window of the present disclosure, the first time window is any time window out of M time windows, the first radio signal carries a first check bit block. Herein an information bit block corresponding to the first check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

In one embodiment, the UE 450 corresponds to the first node in the present disclosure, the gNB 410 correspond to the second node in the present disclosure.

In one embodiment, the UE 450 corresponds to the second node in the present disclosure, the gNB 410 correspond to the first node in the present disclosure.

In one embodiment, at least one of the antenna 420, the transmitter 418, the transmitting processor 416, the channel encoder 477, the controller/processor 475, or the memory 476 is used for transmitting the first radio signal of the present disclosure in the first time window of the present disclosure; at least one of the antenna 452, the receiver 454, the receiving processor 456, the channel decoder 458, the controller/processor 459, the memory 460, or the data source 467 is used for receiving the first radio signal of the present disclosure in the first time window of the present disclosure.

In one embodiment, at least one of the antenna 452, the transmitter 454, the transmitting processor 468, the channel encoder 457, the controller/processor 459, the memory 460, or the data source 467 is used for transmitting the first radio signal of the present disclosure in the first time window of the present disclosure; at least one of the antenna 420, the receiver 418, the receiving processor 470, the channel decoder 478, the controller/processor 475, or the memory 476 is used for receiving the first radio signal of the present disclosure in the first time window of the present disclosure.

In one embodiment, at least one of the antenna 420, the transmitter 418, the transmitting processor 416, the channel encoder 477, the controller/processor 475, or the memory 476 is used for transmitting the second radio signal of the present disclosure in the second time window of the present disclosure; at least one of the antenna 452, the receiver 454, the receiving processor 456, the channel decoder 458, the controller/processor 459, the memory 460, or the data source 467 is used for receiving the second radio signal of the present disclosure in the second time window of the present disclosure.

In one embodiment, at least one of the antenna 452, the transmitter 454, the transmitting processor 468, the channel encoder 457, the controller/processor 459, the memory 460, or the data source 467 is used for transmitting the second radio signal of the present disclosure in the second time window of the present disclosure; at least one of the antenna 420, the receiver 418, the receiving processor 470, the channel decoder 478, the controller/processor 475, or the memory 476 is used for receiving the second radio signal of the present disclosure in the second time window of the present disclosure.

In one embodiment, at least one of the antenna 420, the transmitter 418, the transmitting processor 416, the channel encoder 477, the controller/processor 475, or the memory 476 is used for repeatedly transmitting K radio signal group(s) of the present disclosure in K time resource group(s) of the present disclosure respectively; at least one of the antenna 452, the receiver 454, the receiving processor 456, the channel decoder 458, the controller/processor 459, the memory 460, or the data source 467 is used for receiving the repeatedly transmitted K radio signal group(s) of the present disclosure in K time resource group(s) of the present disclosure respectively.

In one embodiment, at least one of the antenna 452, the transmitter 454, the transmitting processor 468, the channel encoder 457, the controller/processor 459, the memory 460, or the data source 467 is used for repeatedly transmitting K radio signal group(s) of the present disclosure in K time resource group(s) of the present disclosure respectively; at least one of the antenna 420, the receiver 418, the receiving processor 470, the channel decoder 478, the controller/processor 475, or the memory 476 is used for receiving the repeatedly transmitted K radio signal group(s) of the present disclosure in K time resource group(s) of the present disclosure respectively.

In one embodiment, at least one of the antenna 420, the transmitter 418, the transmitting processor 416, the channel encoder 477, the controller/processor 475, or the memory 476 is used for transmitting the first information of the present disclosure; at least one of the antenna 452, the receiver 454, the receiving processor 456, the channel decoder 458, the controller/processor 459, the memory 460, or the data source 467 is used for receiving the first information of the present disclosure.

In one embodiment, at least one of the antenna 452, the transmitter 454, the transmitting processor 468, the channel encoder 457, the controller/processor 459, the memory 460, or the data source 467 is used for transmitting the second information of the present disclosure; at least one of the antenna 420, the receiver 418, the receiving processor 470, the channel decoder 478, the controller/processor 475, or the memory 476 is used for receiving the second information of the present disclosure.

EMBODIMENT 5

Figure 5:
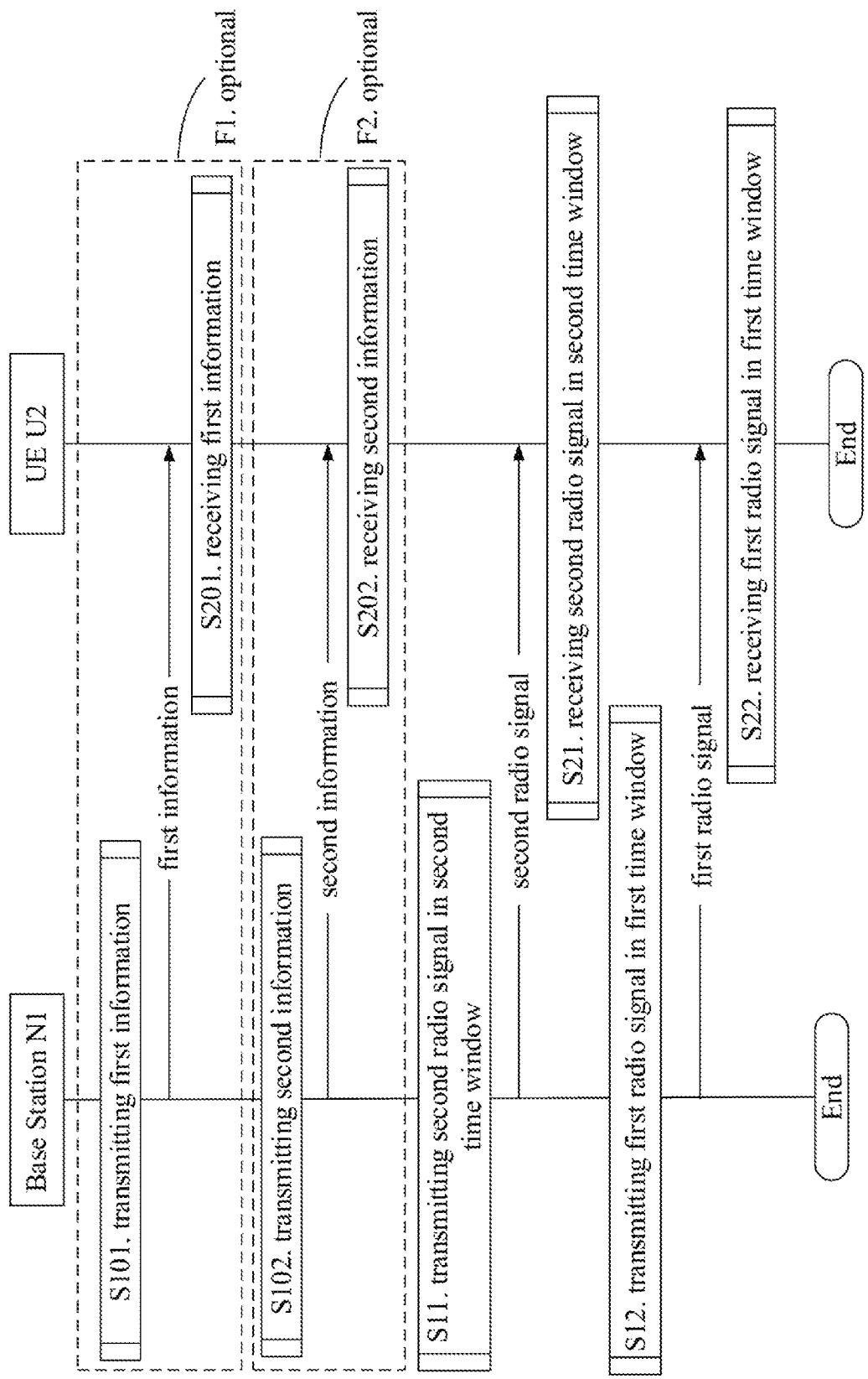
FIG. 5 illustrates a flowchart of wireless transmission according to one embodiment of the present disclosure.

Embodiment 5 illustrates a flowchart of wireless transmission, as shown in FIG. 5. In FIG. 5, a base station N1 is the first node in the present disclosure, a UE U2 is the second node in the present disclosure. The base station N1 is a maintenance base station for a serving cell of the UE U2. In FIG. 5, steps in boxes F1 and F2 are optional, respectively.

The base station N1 transmits first information in step S101; transmits second information in step S102; transmits a second radio signal in a second time window in step S11; and transmits a first radio signal in a first time window in step S12.

The UE U2 receives first information in step S201; receives second information in step S202; receives a second radio signal in a second time window in step S21; and receives a first radio signal in a first time window in step S22.

In Embodiment 5, the first time window is any time window out of M time windows, the first radio signal carries a first check bit block, an information bit block corresponding to the first check bit block comprises a first bit block. Values of bits comprised in the first check bit block are related to a position of the first time window in the M time windows, or, a total number of bits comprised in the first check bit block is related to a position of the first time window in the M time windows. The first bit block is not related to a position of the first time window in the M time windows. The M is a positive integer greater than 1. The second time window is any time window out of M1 time window(s), the second radio signal carries the first bit block; the M1 time window(s) is(are) a subset of the M time windows, the M1 is a positive integer not greater than the M. The M time windows are a time resource group of the K time resource group(s), any time resource group out of the K time resource group(s) comprises a positive integer number of time window(s), the K is a positive integer. The first information is used by the UE U2 for determining the K time resource group(s). The second information is used by the UE U2 for determining at least one of the M and the M1.

In one embodiment, the M1 is fixed.

In one embodiment, the M1 is configurable.

In one embodiment, the second radio signal carries a second bit block and a third check bit block, an information bit block corresponding to the third check bit block comprises the second bit block, the first check bit block is not related to the second bit block. In one embodiment, a bit block output after the first bit block is subjected to a first coding is used for generating the second radio signal, a code rate of the first coding is related to a position of the second time window in the M1 time window(s).

In one embodiment, a first post-coding bit block is acquired after a third coding of a first pre-coding bit block; the first pre-coding bit block comprises the first bit block and the first check bit block; the first post-coding bit block comprises a first post-coding bit sub-block and a second post-coding bit sub-block; the first check bit block comprises a first check bit sub-block and a second check bit sub-block, the first post-coding bit sub-block is not related to the second check bit sub-block; the first post-coding bit sub-block and the second post-coding bit sub-block are used for generating the first radio signal and the second radio signal respectively.

In one embodiment, the M1 is less than the M, the base station N1 only transmits a radio signal carrying the first bit block in the M1 time window(s) out of the M time windows.

In one embodiment, if the first time window is a time window out of M2 time window(s), a first generation polynomial is used for generating the first check bit block; if the first time window is a time window out of M3 time window(s), a second generation polynomial is used for generating the first check bit block; the M2 time window(s) and the M3 time window(s) are two subsets of the M time windows not intersected with each other, the M2 and the M3 are positive integers less than the M, respectively.

In one subembodiment of the above embodiment, the first generation polynomial and the second generation polynomial are CRC Cyclic Generator Polynomials respectively. The specific meaning of the CRC Cyclic Generator Polynomial can be found in 3GPP Technical Specification (TS) 36.212, chapter 5, and 3GPP TS 38.212, chapter 5.

In one embodiment, the first check bit block comprises Q check bit sub-block(s), an information bit block corresponding to each check sub-block out of the Q check bit sub-block(s) comprises the first bit block; the Q is a positive integer.

In one subembodiment of the above embodiment, the Q is related to a position of the first time window in the M time windows.

In one embodiment, the base station N1 repeatedly transmits K radio signal group(s) in K time resource group(s) respectively; wherein any radio signal group of the K radio signal group(s) comprises a positive integer number of radio signal(s).

In one subembodiment of the above embodiment, the base station N1 transmits M radio signals in the M time windows respectively, any radio signal group of the K radio signal group(s) is a repetition of the M radio signals.

In one embodiment, the K is equal to 1.

In one embodiment, the K is greater than 1.

In one embodiment, the first information is carried by a higher-layer signaling.

In one embodiment, the first information is carried by a Radio Resource Control (RRC) signaling.

In one embodiment, the first information is carried by a Medium Access Control layer Control Element (MAC CE) signaling.

In one embodiment, the first information is UE-specific.

In one embodiment, the first information is specific to a terminal group, the terminal group comprises a positive integer number of terminal(s); a target receiver of the first radio signal in the present disclosure is a terminal of the terminal group, the first node is a base station, the second node is a UE.

In one subembodiment of the above embodiment, the UE U2 is a terminal out of the terminal group.

In one embodiment, the first information indicates the K time resource group(s).

In one embodiment, the first information explicitly indicates the K time resource group(s).

In one embodiment, the second information is carried by a higher-layer signaling.

In one embodiment, the second information is carried by an RRC signaling.

In one embodiment, the second information is carried by a MAC CE signaling.

In one embodiment, the second information is carried by a dynamic signaling.

In one embodiment, the first information and the second information are carried by a same signaling.

In one embodiment, the first information and the second information are carried by varied signaling.

In one embodiment, the second information is UE-specific.

In one embodiment, the second information is specific to a terminal group, the terminal group comprises a positive integer number of terminal(s). A target receiver of the first radio signal in the present disclosure is a terminal of the terminal group, the first node is a base station, the second node is a UE.

In one subembodiment of the above embodiment, the UE U2 is a terminal out of the terminal group.

In one embodiment, the second information indicates the M and the M1.

In one embodiment, the second information indicates the M.

In one embodiment, the second information indicates the M1.

In one embodiment, the second information is used for determining the M1 time window(s) out of the M time windows.

In one embodiment, the first node is a base station, the first node transmits the first information.

In one embodiment, the first node is a base station, the first node transmits the second information.

In one embodiment, the second node is a UE, the second node receives the first information.

In one embodiment, the second node is a UE, the second node receives the second information.

In one embodiment, the first radio signal is transmitted on a downlink physical layer control channel (i.e., a downlink channel that can only be used for carrying physical layer signaling), the first node is a base station, the second node is a UE.

In one embodiment, the downlink physical layer control channel is a Physical Downlink Control Channel (PDCCH).

In one embodiment, the downlink physical layer control channel is a short PDCCH (sPDCCH).

In one embodiment, the downlink physical layer control channel is a New Radio PDCCH (NR-PDCCH).

In one embodiment, the downlink physical layer control channel is a Narrow Band PDCCH (NB-PDCCH).

In one embodiment, the first radio signal is transmitted on a downlink physical layer data channel (i.e., a downlink channel that can be used for carrying physical layer data), the first node is a base station, the second node is a UE.

In one embodiment, the downlink physical layer data channel is a Physical Downlink Shared Channel (PDSCH).

In one embodiment, the downlink physical layer data channel is a short PDSCH (sPDSCH).

In one embodiment, the downlink physical layer data channel is a New Radio PDSCH (NR-PDSCH).

In one embodiment, the downlink physical layer data channel is a Narrow Band PDSCH (NB-PDSCH).

In one embodiment, a transmission channel for the first radio signal is a Downlink Shared Channel (DL-SCH), the first node is a base station, the second node is a UE.

In one embodiment, the first radio signal and the second radio signal are both transmitted on a downlink physical layer control channel, the first node is a base station, the second node is a UE.

In one embodiment, the first radio signal and the second radio signal are both transmitted on a downlink physical layer data channel, the first node is a base station, the second node is a UE.

In one embodiment, the first radio signal and the second radio signal both correspond to a transmission channel that is DL-SCH, the first node is a base station, the second node is a UE.

In one embodiment, all radio signals in the K radio signal group(s) are transmitted on a downlink physical layer control channel, the first node is a base station, the second node is a UE.

In one embodiment, all radio signals in the K radio signal group(s) are transmitted on a downlink physical layer data channel, the first node is a base station, the second node is a UE.

In one embodiment, all radio signals in the K radio signal group(s) correspond to a transmission channel that is DL-SCH, the first node is a base station, the second node is a UE.

In one embodiment, the first information is transmitted on a downlink physical layer data channel (i.e., a downlink channel that can be used for carrying physical layer data).

In one subembodiment of the above embodiment, the downlink physical layer data channel is a PDSCH.

In one subembodiment of the above embodiment, the downlink physical layer data channel is a sPDSCH.

In one subembodiment of the above embodiment, the downlink physical layer data channel is a NR-PDSCH.

In one subembodiment of the above embodiment, the downlink physical layer data channel is a NB-PDSCH.

In one embodiment, the second information is transmitted on a downlink physical layer control channel (i.e., a downlink channel that can be used for carrying physical layer signaling)

In one subembodiment of the above embodiment, the downlink physical layer control channel is a PDCCH.

In one subembodiment of the above embodiment, the downlink physical layer control channel is a sPDCCH.

In one subembodiment of the above embodiment, the downlink physical layer control channel is a NR-PDCCH.

In one subembodiment of the above embodiment, the downlink physical layer control channel is a NB-PDCCH.

EMBODIMENT 6

Figure 6:
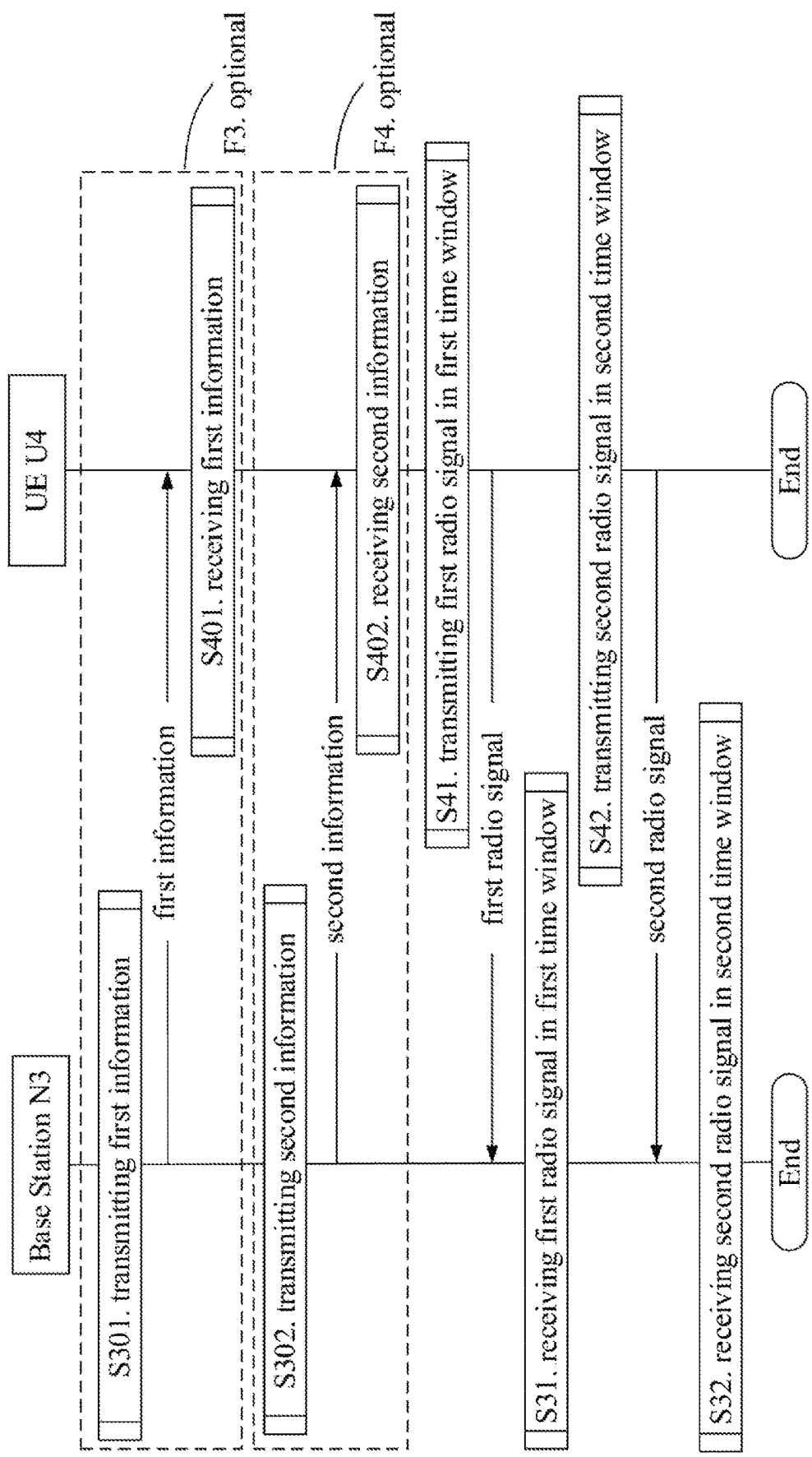
FIG. 6 illustrates a flowchart of wireless transmission according to one embodiment of the present disclosure.

Embodiment 6 illustrates a flowchart of wireless transmission, as shown in FIG. 6. In FIG. 6, a base station N3 is the second node in the present disclosure, a UE U4 is the first node in the present disclosure. The base station N3 is a maintenance base station for a serving cell of the UE U4. In FIG. 6, steps in boxes F3 and F4 are optional, respectively.

The base station N3 transmits first information in step S301; transmits second information in step S302; receives a first radio signal in a first time window in step S31; and receives a second radio signal in a second time window in step S32.

The UE U4 receives first information in step S401; receives second information in step S402; transmits a first radio signal in a first time window in step S41; and transmits a second radio signal in a second time window in step S42.

In Embodiment 6, the first time window is any time window out of M time windows, the first radio signal carries a first check bit block, an information bit block corresponding to the first check bit block comprises a first bit block. Values of bits comprised in the first check bit block are related to a position of the first time window in the M time windows, or, a total number of bits comprised in the first check bit block is related to a position of the first time window in the M time windows. The first bit block is not related to a position of the first time window in the M time windows. The M is a positive integer greater than 1. The second time window is any time window out of M1 time window(s), the second radio signal carries the first bit block; the M1 time window(s) is(are) a subset of the M time windows, the M1 is a positive integer not greater than the M. The M time windows are a time resource group of the K time resource group(s), any time resource group out of the K time resource group(s) comprises a positive integer number of time window(s), the K is a positive integer. The first information is used by the UE U4 for determining the K time resource group(s). The second information is used by the UE U4 for determining at least one of the M and the M1.

In one embodiment, a first post-coding bit block is acquired after a third coding of a first pre-coding bit block; the first pre-coding bit block comprises the first bit block and the first check bit block; the first post-coding bit block comprises a first post-coding bit sub-block and a second post-coding bit sub-block; the first check bit block comprises a first check bit sub-block and a second check bit sub-block, the first post-coding bit sub-block is not related to the second check bit sub-block; the first post-coding bit sub-block and the second post-coding bit sub-block are used for generating the first radio signal and the second radio signal respectively.

In one embodiment, the M1 is less than the M, the UE U4 only transmits a radio signal carrying the first bit block in the M1 time window(s) out of the M time windows.

In one embodiment, the UE U4 repeatedly transmits K radio signal group(s) in the K time resource group(s) respectively; wherein any radio signal group of the K radio signal group(s) comprises a positive integer number of radio signal(s).

In one subembodiment of the above embodiment, the UE U4 transmits M radio signals in the M time windows respectively, any radio signal group of the K radio signal group(s) is a repetition of the M radio signals.

In one embodiment, the first information is specific to a terminal group, the terminal group comprises a positive integer number of terminal(s), the first node in the present disclosure is a terminal out of the terminal group, the first node is a UE, the second node is a base station.

In one subembodiment of the above embodiment, the UE U4 is a terminal of the terminal group.

In one embodiment, the second information is specific to a terminal group, the terminal group comprises a positive integer number of terminal(s), the first node in the present disclosure is a terminal out of the terminal group, the first node is a UE, the second node is a base station.

In one embodiment, the first node is a UE, the first node receives the first information.

In one embodiment, the first node is a UE, the first node receives the second information.

In one embodiment, the second node is a base station, the second node transmits the first information.

In one embodiment, the second node is a base station, the second node transmits the second information.

In one embodiment, the first radio signal is transmitted on an uplink physical layer control channel (i.e., an uplink channel that can only be used for carrying physical layer signaling), the first node is a UE, the second node is a base station.

In one embodiment, the uplink physical layer control channel is a Physical Uplink Control Channel (PUCCH).

In one embodiment, the uplink physical layer control channel is a short PUCCH (sPUCCH).

In one embodiment, the uplink physical layer control channel is a New Radio PUCCH (NR-PUCCH).

In one embodiment, the uplink physical layer control channel is a Narrow Band PUCCH (NB-PUCCH).

In one embodiment, the first radio signal is transmitted on an uplink physical layer data channel (i.e., an uplink channel that can be used for carrying physical layer data), the first node is a UE, the second node is a base station.

In one embodiment, the uplink physical layer data channel is a Physical Uplink Shared Channel (PUSCH).

In one embodiment, the uplink physical layer data channel is a short PUSCH (sPUSCH).

In one embodiment, the uplink physical layer data channel is a New Radio PUSCH (NR-PUSCH).

In one embodiment, the uplink physical layer data channel is a Narrow Band PUSCH (NB-PUSCH).

In one embodiment, a transmission channel for the first radio signal is an Uplink Shared Channel (UL-SCH), the first node is a UE, the second node is a base station.

In one embodiment, the first radio signal and the second radio signal are both transmitted on an uplink physical layer control channel, the first node is a UE, the second node is a base station.

In one embodiment, the first radio signal and the second radio signal are both transmitted on an uplink physical layer data channel, the first node is a UE, the second node is a base station.

In one embodiment, the first radio signal and the second radio signal both correspond to a transmission channel that is UL-SCH, the first node is a UE, the second node is a base station.

In one embodiment, all radio signals in the K radio signal group(s) are transmitted on an uplink physical layer control channel, the first node is a UE, the second node is a base station.

In one embodiment, all radio signals in the K radio signal group(s) are transmitted on an uplink physical layer data channel, the first node is a UE, the second node is a base station.

In one embodiment, all radio signals in the K radio signal group(s) correspond to a transmission channel that is UL-SCH, the first node is a UE, the second node is a base station.

EMBODIMENT 7

Figure 7:
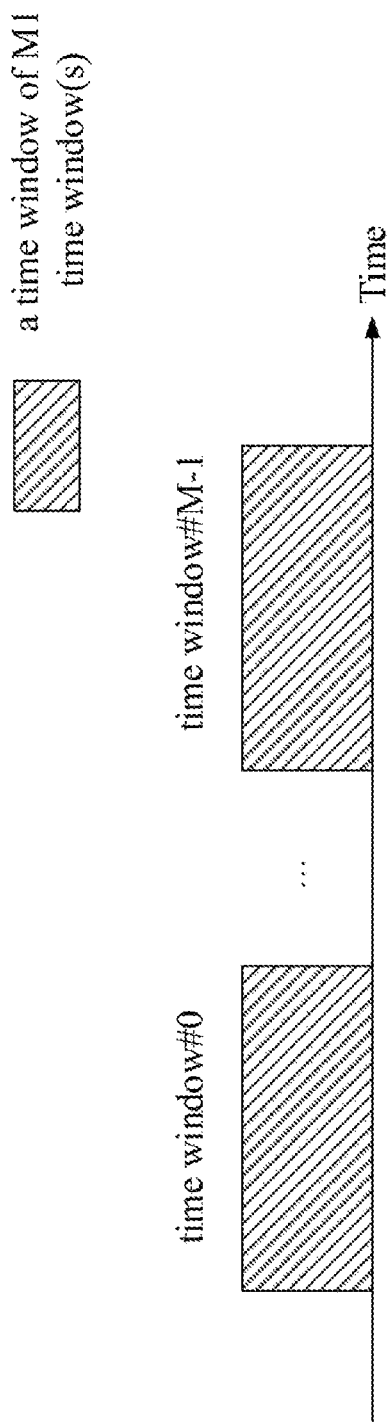
FIG. 7 illustrates a schematic diagram of a relationship between M time windows and M1 time window(s) according to one embodiment of the present disclosure.

Embodiment 7 illustrates a schematic diagram of a relationship between M time windows and M1 time window(s); as shown in FIG. 7.

In Embodiment 7, the first node of the present disclosure transmits the first radio signal of the present disclosure in the first time window of the present disclosure, and transmits the second radio signal of the present disclosure in the second time window of the present disclosure. The first time window is any time window out of the M time windows, the second time window is any time window out of the M1 time window(s); the M1 time window(s) is(are) a subset of the M time windows. The M1 is equal to the M. The first radio signal carries the first check bit block in the present disclosure, the second radio signal carries the first bit block in the present disclosure. An information bit block corresponding to the first check bit block comprises the first bit block.

In FIG. 7, indices for the M time windows are #0 . . . , and #M−1, respectively, a box filled with slashes represents a time window out of the M1 time window(s).

In one embodiment, any time window out of the M time windows is a consecutive time duration.

In one embodiment, any time window out of the M time windows is a slot.

In one embodiment, any time window out of the M time windows is a sub-frame.

In one embodiment, any time window out of the M time windows is 1 ms.

In one embodiment, any time window out of the M time windows comprises a positive integer number of consecutive multicarrier symbols.

In one embodiment, any time window out of the M time windows is made up of 7 consecutive multicarrier symbols.

In one embodiment, any time window out of the M time windows is made up of 14 consecutive multicarrier symbols.

In one embodiment, the M time windows are pairwise orthogonal (not overlapping) in time domain.

In one embodiment, any two time windows out of the M time windows occupy time resources of a same length.

In one embodiment, the M is equal to 2.

In one embodiment, the M is greater than 2.

In one embodiment, the M time windows are consecutive in time domain.

In one subembodiment of the above embodiment, the M is equal to 2.

In one embodiment, the multicarrier symbol is an Orthogonal Frequency Division Multiplexing (OFDM) symbol.

In one embodiment, the multicarrier symbol is a Single Carrier—Frequency Division Multiple Access (SC-FDMA) symbol.

In one embodiment, the multicarrier symbol is a Discrete Fourier Transform Spread OFDM (DFT-S-OFDM) symbol.

In one embodiment, the first node transmits M radio signals in the M time windows respectively, at least two radio signals of the M radio signals are duplicate (the same).

In one embodiment, the first node transmits M radio signals in the M time windows respectively, at least two radio signals of the M radio signals are distinct from one another.

In one embodiment, the first node transmits M radio signals in the M time windows respectively, any two radio signals of the M radio signals are distinct from each other.

In one embodiment, the second node in the present disclosure receives M radio signals in the M time windows respectively, the second node then merges the M radio signals received and recovers the first bit block from a combined signal.

In one subembodiment of the above embodiment, the second node performs symbol-level combination on duplicate (same) radio signals out of the received M radio signals.

In one subembodiment of the above embodiment, the second node performs bit-level combination on distinct radio signals out of the received M radio signals.

In one embodiment, the M1 is equal to the M.

EMBODIMENT 8

Figure 8:
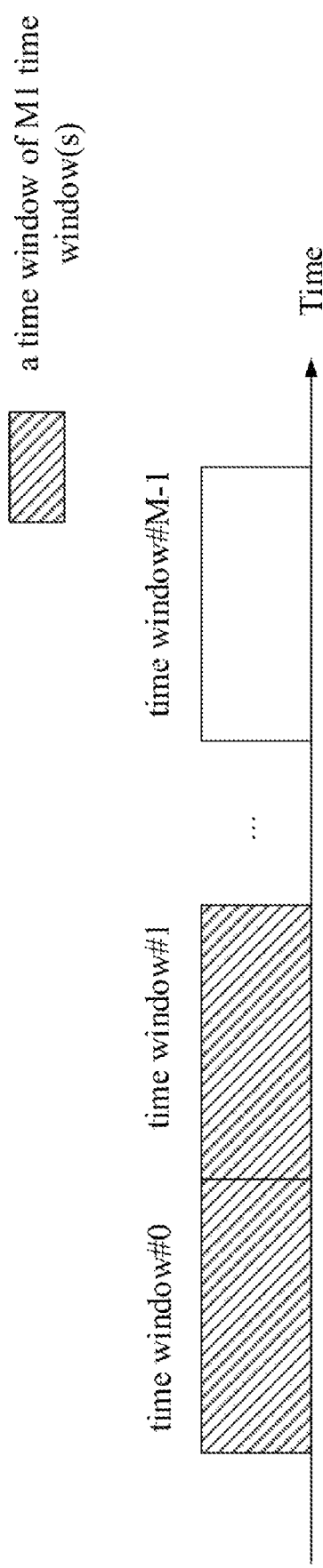
FIG. 8 illustrates a schematic diagram of a relationship between M time windows and M1 time window(s) according to one embodiment of the present disclosure.

Embodiment 8 illustrates a schematic diagram of a relationship between M time windows and M1 time window(s), as shown in FIG. 8.

In Embodiment 8, the first node of the present disclosure transmits the first radio signal of the present disclosure in the first time window of the present disclosure, and transmits the second radio signal of the present disclosure in the second time window of the present disclosure. The first time window is any time window out of the M time windows, the second time window is any time window out of the M1 time window(s); the M1 time window(s) is(are) a subset of the M time windows. The M1 is less than the M. The first radio signal carries the first check bit block in the present disclosure, the second radio signal carries the first bit block in the present disclosure. An information bit block corresponding to the first check bit block comprises the first bit block.

In FIG. 8, indices for the M time windows are #0, #1 . . . , and #M−1, respectively. A box filled with slashes represents a time window out of the M1 time window(s).

In one embodiment, the M1 is less than the M.

In one embodiment, the M1 is fixed.

In one embodiment, the M1 is configurable.

In one embodiment, for the M1 given above, position(s) of the M1 time window(s) in the M time windows is(are) fixed, so there is no need for configuration.

In one embodiment, the M1 time window(s) is(are) earliest M1 time window(s) out of the M time windows.

In one embodiment, the M1 time windows are consecutive in the M time windows.

In one embodiment, the M1 is equal to a difference between the M and 1.

In one embodiment, the M1 is equal to a difference between the M and 2.

In one embodiment, the first node repeatedly transmits M1 radio signal(s) within the M1 time window(s) respectively, the second radio signal is a radio signal of the M1 radio signal(s).

In one subembodiment of the above embodiment, any two radio signals out of the M1 radio signals are the same.

In one subembodiment of the above embodiment, the second node in the present disclosure performs combination on the M1 radio signal(s) received and recovers the first bit block from a combined signal.

In one subembodiment of the above embodiment, the combination is symbol-level combination.

In one embodiment, for any given time window out of the M time windows that does not belong to the M1 time window(s), the first node transmits a given radio signal in the any given time window, a bit block output after a given check bit block is subjected to a given coding is used for generating the given radio signal. An information bit block corresponding to the given check bit block comprises the first bit block, an input of the given coding does not comprise the first bit block.

In one subembodiment of the above embodiment, the given coding includes channel coding and rate matching.

In one subembodiment of the above embodiment, the given radio signal is an output after a bit block output from a given coding of the given check bit block is sequentially subjected to part of or all processes of concatenation, scrambling, a modulation mapper, a layer mapper, a transform precoder, precoding, a resource element mapper, multicarrier symbol generation, and modulation and upconversion.

EMBODIMENT 9

Figure 9:
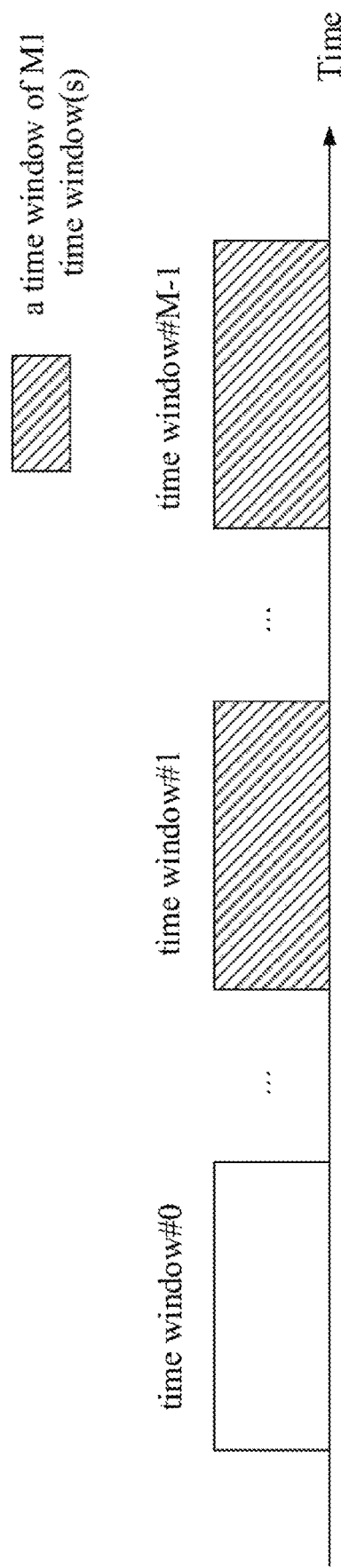
FIG. 9 illustrates a schematic diagram of a relationship between M time windows and M1 time window(s) according to one embodiment of the present disclosure.

Embodiment 9 illustrates a schematic diagram of a relationship between M time windows and M1 time window(s), as shown in FIG. 9.

In Embodiment 9, the first node of the present disclosure transmits the first radio signal of the present disclosure in the first time window of the present disclosure, and transmits the second radio signal of the present disclosure in the second time window of the present disclosure. The first time window is any time window out of the M time windows, the second time window is any time window out of the M1 time window(s); the M1 time window(s) is(are) a subset of the M time windows. The M1 is less than the M.

In FIG. 9, indices for the M time windows are #0, #1 . . . , and #M−1, respectively. A box filled with slashes represents a time window out of the M time windows.

In one embodiment, any two time windows of the M time windows are not consecutive in time domain.

In one embodiment, at least two adjacent time windows out of the M time windows are not consecutive in time domain.

In one embodiment, at least two adjacent time windows out of the M1 time windows are not consecutive in the M time windows.

EMBODIMENT 10

Figure 10:
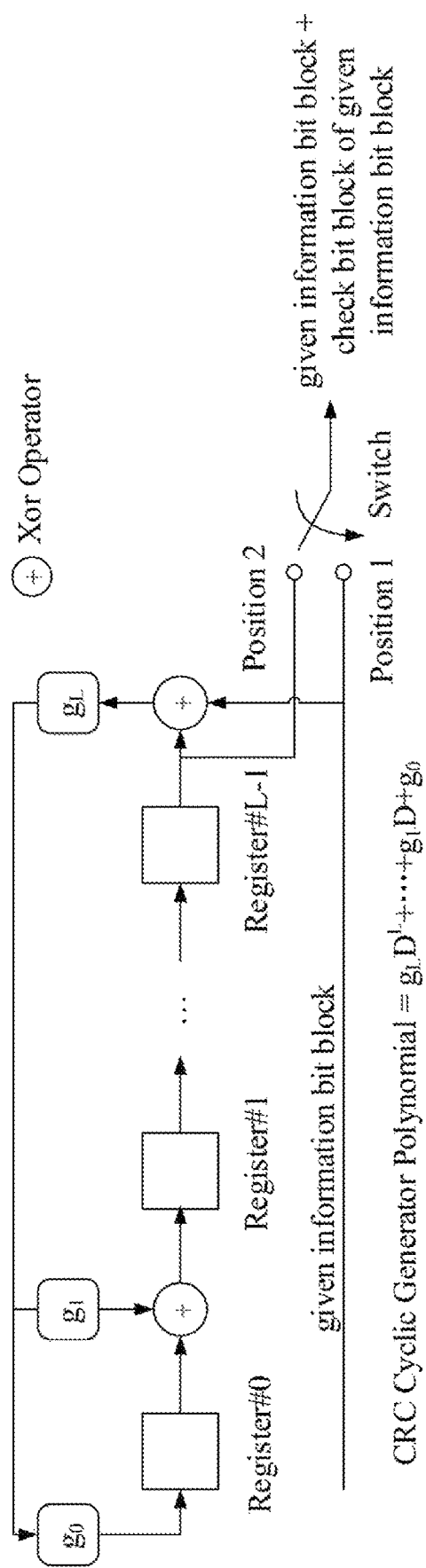
FIG. 10 illustrates a block diagram of a circuit used for generating check bit blocks according to one embodiment of the present disclosure.

Embodiment 10 illustrates a block diagram of a circuit used for generating check bit blocks; as shown in FIG. 10.

In Embodiment 10, a check bit block of a given information bit block is an output after the given information bit block is subjected to CRC Cyclic Generator Polynomial. A block diagram of a circuit for check bit block is shown in FIG. 10.

In FIG. 10, the CRC Cyclic Generator Polynomial is described as: $g_L D^L + \ldots + g_1 D + g_0$, wherein $g_L, \ldots, g_1$, and $g_0$ are coefficients of the CRC Cyclic Generator Polynomial, the L is a total number of bits comprised in the check bit block of the given information bit block, a value of any coefficient out of coefficients of the CRC Cyclic Generator Polynomial is equal to 0 or 1. A circuit in FIG. 10 comprises a shift-register sequence consisting of L shift registers, a switch, L+1 taps, and L exclusive or (Xor) operators. The L+1 taps are located at both sides of the L shift registers respectively, as shown in FIG. 10. Indices for the L shift registers are #0, #1 . . . , and #L−1, respectively. The L+1 taps respectively correspond to L+1 coefficients of the CRC Cyclic Generator Polynomial, which are $g_L, \ldots, g_1$, and $g_0$.

Home position of a switch in FIG. 10 is located at position 1 in FIG. 10, bits in the given information bit block are sequentially input to a shift register sequence consisting of L shift registers, and are sequentially output at the same time. After all bits in the given information bit block have been input to the shift register sequence consisting of L shift registers, the switch is shifted to position 2 in FIG. 10, and then begins to output values in the L shift registers in sequence, starting from shift register #L−1. Values in the L shift registers that are output constitute the check bit block of the given information bit block.

In one embodiment, the specific meaning and technical details of and generation method for the check bit blocks can be found in 3GPP TS 36.212, chapter 5, and 3GPP TS 38.212, chapter 5.

In one embodiment, a polynomial consisting of the given information bit block and the check bit block of the given information bit block can be divided by the CRC Cyclic Generator Polynomial on GF(2), namely, a polynomial consisting of the given information bit block and the check bit block of the given information bit block yields a remainder equal to 0 when divided by the CRC Cyclic Generator Polynomial.

In one embodiment, a polynomial consisting of the given information bit block and the check bit block of the given information bit block is: $a_0 D^{L+A-1} + \ldots + a_{A-1} D^L + p_0 D^{L-1} + p_1 D^{L-2} + \ldots p_{L-2} D + p_{L-1}$, wherein the A is the number of bits comprised in the given information bit block; the $a_0$, $a_1, \ldots,$ and $a_{A-1}$ are A bits comprised in the given information bit block; the $p_0, p_1, \ldots$ and $p_{L-1}$ are L bits comprised in the check bit block of the given information bit block.

In one embodiment, the CRC Cyclic Generator Polynomial is $D^{24}+D^{23}+D^{18}+D^{17}+D^{14}+D^{11}+D^{10}+D^7+D^6+D^5+D^4+D^3+D+1$.

In one embodiment, the CRC Cyclic Generator Polynomial is $D^{24}+D^{23}+D^6+D^5+D+1$.

In one embodiment, the CRC Cyclic Generator Polynomial is $D^{24}+D^{23}+D^{21}+D^{20}+D^{17}+D^{15}+D^{13}+D^{12}+D^8+D^4+D^2+D+1$.

In one embodiment, the CRC Cyclic Generator Polynomial is $D^{16}+D^{12}+D^5+1$.

In one embodiment, the CRC Cyclic Generator Polynomial is $D^8+D^7+D^4+D^3+D+1$.

In one embodiment, the CRC Cyclic Generator Polynomial is $D^{11}+D^{10}+D^9+D^5+1$.

In one embodiment, the CRC Cyclic Generator Polynomial is $D^6+D^5+1$.

In one embodiment, an initial value for each of the L shift registers is 0.

In one embodiment, an initial value for each of the L shift registers is 1.

In one embodiment, an initial value for at least one the L shift registers is not 0.

In one embodiment, initial values for the L shift registers are pre-configured.

In one embodiment, the given information bit block is the first bit block in the present disclosure, the check bit block of the given information bit block is used for generating the first check bit block in the present disclosure.

In one embodiment, the given information bit block comprises all bits of the first bit block and all bits of a second check bit block in the present disclosure; the check bit block of the given information bit block is used for generating the first check bit block in the present disclosure, an information bit block corresponding to the second check bit block is the first bit block.

In one embodiment, the given information bit block is the first bit block in the present disclosure, the check bit block of the given information bit block is used for generating a check bit sub-block of the Q check bit sub-block(s) in the present disclosure.

In one embodiment, the given information bit block comprises all bits of the first bit block and all bits of a third check bit sub-block in the present disclosure; the check bit block of the given information bit block is used for generating a fourth Check bit sub-block; the third check bit sub-block and the fourth check bit sub-block are respectively check bit sub-blocks of the Q check bit sub-blocks in the present disclosure, an information bit block corresponding to the third check bit sub-block is the first bit block.

EMBODIMENT 11

Figure 11:
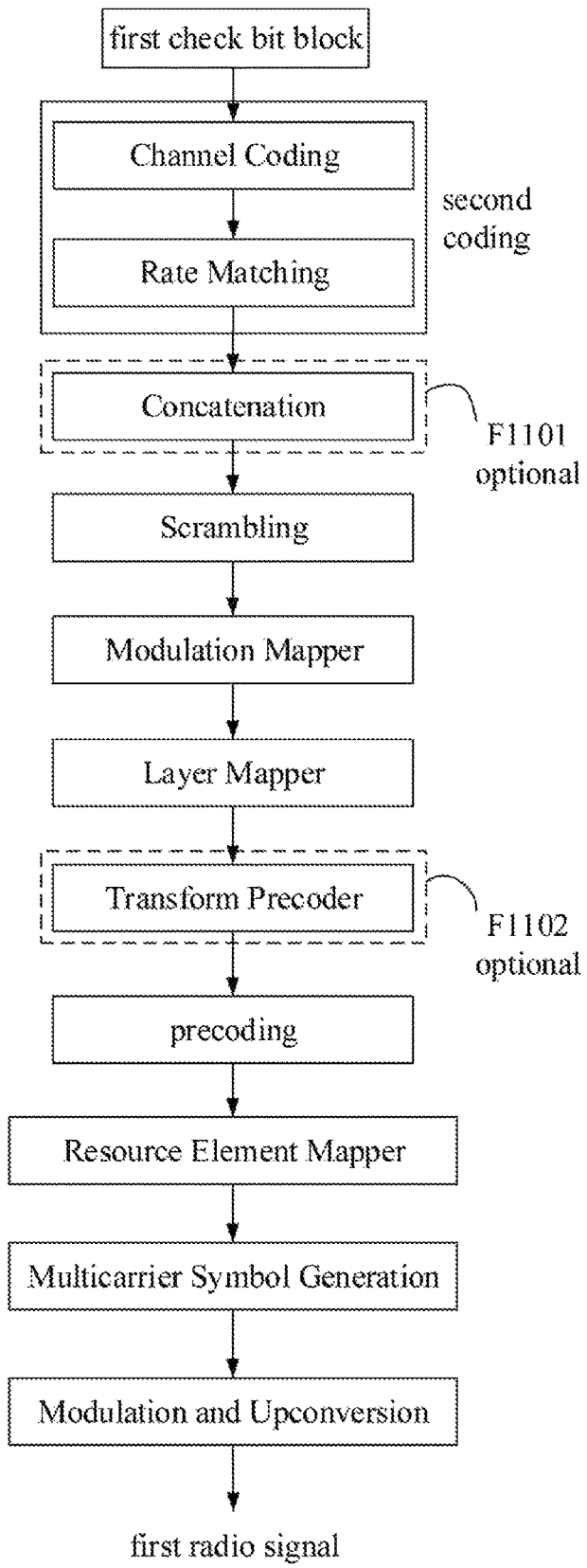
FIG. 11 illustrates a schematic diagram of a first radio signal carrying a first check bit block according to one embodiment of the present disclosure.

Embodiment 11 illustrates a schematic diagram of a first radio signal carrying a first check bit block; as shown in FIG. 11.

In Embodiment 11, the first node of the present disclosure transmits the first radio signal of the present disclosure in the first time window of the present disclosure, the first time window is any time window out of the M time windows, the first radio signal carries the first check bit block. The first radio signal is an output after the first check bit block is sequentially subjected to part of or all processes of channel coding, rate matching, concatenation, scrambling, a modulation mapper, a layer mapper, a transform precoder, precoding, a resource element mapper, multicarrier symbol generation, and modulation and upconversion. In FIG. 11, processing steps in dotted boxes F1101 and F1102 are optional, respectively.

In one embodiment, the phrase that the first radio signal carries a first check bit block refers to: the first radio signal is an output after the first check bit block is sequentially subjected to part of or all processes of channel coding, rate matching, concatenation, scrambling, a modulation mapper, a layer mapper, a transform precoder, precoding, a resource element mapper, multicarrier symbol generation, and modulation and upconversion.

In one embodiment, the multicarrier symbol generation is OFDM symbol generation.

In one embodiment, the multicarrier symbol generation is SC-FDMA symbol generation.

In one embodiment, the multicarrier symbol generation is DFT-S-OFDM symbol generation.

In one embodiment, the first radio signal does not carry the first bit block in the present disclosure.

In one embodiment, an input of channel coding in FIG. 11 does not comprise the first bit block in the present disclosure.

In one embodiment, channel coding and rate matching in FIG. 11 constitute a second coding, a code rate of the second coding is related to a position of the first time window in the M time windows.

In one embodiment, the channel coding is a polar code.

In one embodiment, the specific method of implementing polar code can be found in 3GPP TS 38.212, chapter 5.3.

In one embodiment, the channel coding is Low Density Parity Check (LDPC) code.

In one embodiment, the specific method of implementing LDPC code can be found in 3GPP TS 38.212, chapter 5.3.

EMBODIMENT 12

Figure 12:
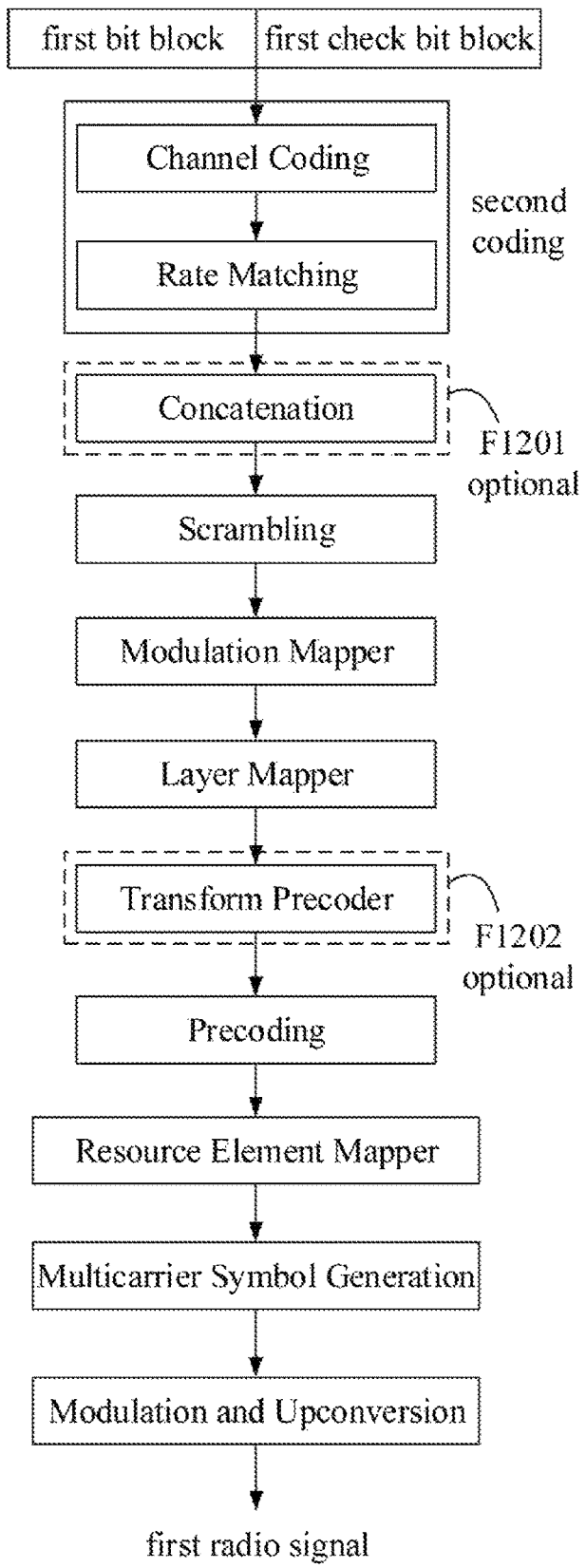
FIG. 12 illustrates a schematic diagram of a first radio signal carrying a first check bit block according to one embodiment of the present disclosure.

Embodiment 12 illustrates a schematic diagram of a first radio signal carrying a first check bit block; as shown in FIG. 12.

In Embodiment 12, the first radio signal carries the first check bit block and the first bit block of the present disclosure, an information bit block corresponding to the first check bit block comprises the first bit block. The first radio signal is an output after all bits in the first bit block and the first check bit block are sequentially subjected to part of or all processes of channel coding, rate matching, concatenation, scrambling, a modulation mapper, a layer mapper, a transform precoder, precoding, a resource element mapper, multicarrier symbol generation, and modulation and upconversion. In FIG. 12, processing steps in dotted boxes F1201 and F1202 are optional, respectively.

In one embodiment, the first radio signal carries the first bit block.

EMBODIMENT 13

Figure 13:
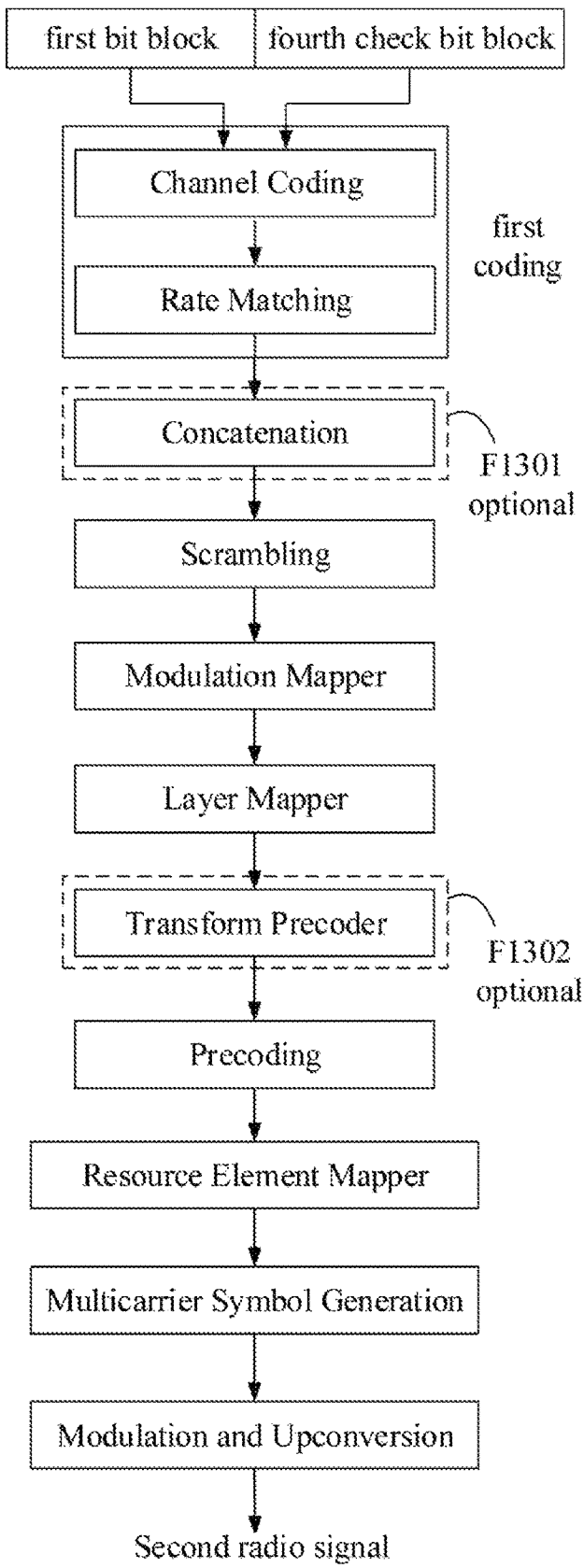
FIG. 13 illustrates a schematic diagram of a second radio signal carrying a first bit block according to one embodiment of the present disclosure.

Embodiment 13 illustrates a schematic diagram of a second radio signal carrying a first bit block; as shown in FIG. 13.

In Embodiment 13, the first node of the present disclosure transmits the second radio signal in the second time window of the present disclosure, the second time window is any time window out of the M time windows, the M1 time window(s) is(are) a subset of the M time windows. The second radio signal carries the first bit block and a fourth check bit block, an information bit block corresponding to the fourth check bit block comprises the first bit block. The second radio signal is an output after all bits in the first bit block and the fourth check bit block are sequentially subjected to part of or all processes of channel coding, rate matching, concatenation, scrambling, a modulation mapper, a layer mapper, a transform precoder, precoding, a resource element mapper, multicarrier symbol generation, and modulation and upconversion. In FIG. 13, processing steps in dotted boxes F1301 and F1302 are optional, respectively.

In one embodiment, the phrase that the second radio signal carries the first bit block refers to: the second radio signal is an output after the first bit block is sequentially subjected to part of or all processes of channel coding, rate matching, concatenation, scrambling, a modulation mapper, a layer mapper, a transform precoder, precoding, a resource element mapper, multicarrier symbol generation, and modulation and upconversion.

In one embodiment, the second radio signal carries the first bit block and a fourth check bit block, an information bit block corresponding to the fourth check bit block comprises the first bit block.

In one embodiment, the fourth check bit block is generated by a check bit block of the first bit block.

In one embodiment, the second radio signal is an output after all bits in the first bit block and the fourth check bit block are sequentially subjected to part of or all processes of channel coding, rate matching, concatenation, scrambling, a modulation mapper, a layer mapper, a transform precoder, precoding, a resource element mapper, multicarrier symbol generation, and modulation and upconversion.

In one embodiment, values of bits comprised in the fourth check bit block are related to a position of the second time window in the M1 time window(s).

In one embodiment, a total number of bits comprised in the fourth check bit block are related to a position of the second time window in the M1 time window(s).

In one embodiment, the first check bit block is a CRC (Cyclic Redundancy Check) bit block of the first bit block.

In one embodiment, the first check bit block is a bit block after a CRC bit block of the first bit block is subject to scrambling.

In one embodiment, a total number of bits comprised in the fourth check bit block are not related to a position of the second time window in the M1 time window(s).

In one embodiment, the first coding in the present disclosure includes channel coding and rate matching in FIG. 13.

In one embodiment, channel coding and rate matching in FIG. 13 constitute the first coding in the present disclosure.

In one embodiment, an input of the first coding comprises the first bit block and the fourth check bit block.

In one embodiment, the channel coding is a polar code.

In one embodiment, the channel coding is a LDPC code.

In one embodiment, the second radio signal is an output after the bit block output from the first coding in the present disclosure of the first bit block is sequentially subjected to part of or all processes of concatenation, scrambling, a modulation mapper, a layer mapper, a transform precoder, precoding, a resource element mapper, multicarrier symbol generation, and modulation and upconversion.

EMBODIMENT 14

Figure 14:
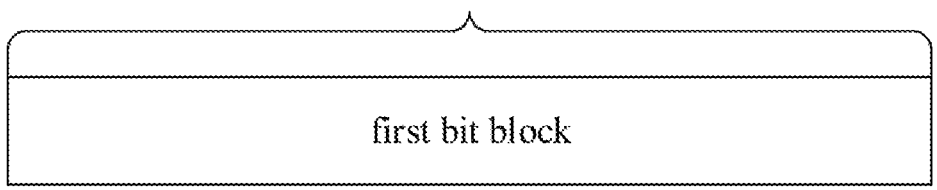
FIG. 14 illustrates a schematic diagram of an information bit block corresponding to a first check bit block according to one embodiment of the present disclosure.

Embodiment 14 illustrates a schematic diagram of an information bit block corresponding to a first check bit block according; as shown in FIG. 14.

In Embodiment 14, an information bit block corresponding to a first check bit block consists of the first bit block in the present disclosure.

In one embodiment, an information bit block corresponding to the first check bit block is the first bit block.

In one embodiment, the first check bit block is generated by a check bit block of the first bit block.

In one embodiment, the first check bit block is a check bit block of the first bit block.

In one embodiment, the first check bit block is a bit block output from scrambling of a check bit block of the first bit block.

In one subembodiment of the above embodiment, a scrambling code sequence employed by the scrambling is related to an identifier for the first node in the present disclosure.

In one reference embodiment of the above subembodiment, the first node is a UE, the identifier for the first node is Cell-Radio Network Temporary Identifier (C-RNTI).

In one reference embodiment of the above subembodiment, the first node is a base station, the identifier for the first node is a Physical Cell Identifier (PCI).

In one subembodiment of the above embodiment, a scrambling code sequence employed by the scrambling is related to an identifier for a target receiver of the first radio signal.

In one reference embodiment of the above subembodiment, the first node is a UE, the identifier for the target receiver of the first radio signal is C-RNTI.

In one reference embodiment of the above subembodiment, the first node is a UE, the identifier for the target receiver of the first radio signal is PCI.

In one embodiment, a check bit block of the first bit block is an output after the first bit block is subjected to CRC Cyclic Generator Polynomial.

In one subembodiment of the above embodiment, bits in the first bit block are sequentially input to a shift register sequence corresponding to the CRC Cyclic Generator Polynomial.

In one embodiment, a polynomial consisting of the first bit block and a check bit block of the first bit block can be divided by a CRC Cyclic Generator Polynomial on GF(2), namely, a polynomial consisting of the first bit block and a check bit block of the first bit block yields a remainder equal to 0 when divided by the CRC Cyclic Generator Polynomial.

In one embodiment, the first bit block is a Transport Block (TB).

In one embodiment, the first bit block comprises a TB.

In one embodiment, the first bit block comprises Downlink Control Information (DCI), the first node is a base station.

In one embodiment, the first bit block comprises Uplink Control Information (UCI), the first node is a UE.

In one subembodiment of the above embodiment, the UCI includes one or more of Hybrid Automatic Repeat request-Acknowledgement (HARQ-ACK), Scheduling Request (SR), Channel State Information (CSI), a Channel-state information reference signals Resource Indicator (CRI), a Rank Indicator (RI), a Precoding Matrix Indicator (PMI), Reference Signal Received Power (RSRP), Reference Signal Received Quality (RSRQ), or a Channel Quality Indicator (CQI).

In one embodiment, the first bit block comprises a first bit sub-block and a second bit sub-block, values of all bits in the second bit sub-block are fixed.

In one subembodiment of the above embodiment, the first bit sub-block is a TB.

In one subembodiment of the above embodiment, the first bit sub-block comprises DCI, the first node is a base station.

In one subembodiment of the above embodiment, the first bit sub-block comprises UCI, the first node is a UE.

In one subembodiment of the above embodiment, values of all bits in the second bit sub-block are equal to 1.

In one subembodiment of the above embodiment, the number of bits comprised in the second bit sub-block is 24.

In one subembodiment of the above embodiment, the second bit sub-block is located at the forefront of the first bit block.

In one subembodiment of the above embodiment, bits in the first bit block are sequentially input to a shift register sequence corresponding to a CRC Cyclic Generator Polynomial, bits in the second bit sub-block are input to a shift register sequence corresponding to the CRC Cyclic Generator Polynomial ahead of those in the first bit sub-block.

EMBODIMENT 15

Figure 15:
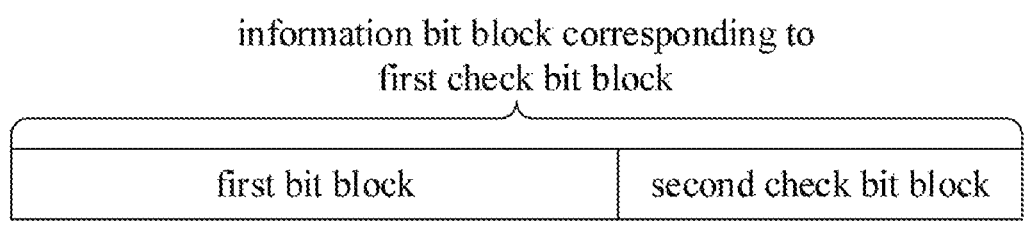
FIG. 15 illustrates a schematic diagram of an information bit block corresponding to a first check bit block according to one embodiment of the present disclosure.

Embodiment 15 illustrates a schematic diagram of an information bit block corresponding to a first check bit block; as shown in FIG. 15.

In Embodiment 15, an information bit block corresponding to a first check bit block comprises the first bit block and a second check bit block in the present disclosure, an information bit block corresponding to the second check bit block is the first bit block.

In one embodiment, an information bit block corresponding to a first check bit block comprises the first bit block and a second check bit block, an information bit block corresponding to the second check bit block is the first bit block.

In one embodiment, the first check bit block is generated by a check bit block of the first bit block and the second check bit block.

In one embodiment, a check bit block of the first bit block and the second check bit block is an output after all bits in the first bit block and the second check bit block are subjected to a CRC Cyclic Generator Polynomial.

In one embodiment, a radio signal carrying the second check bit block is transmitted in a time window ahead of the first time window within the M time windows.

In one embodiment, the first radio signal does not carry the second check bit block.

EMBODIMENT 16

Figure 16:
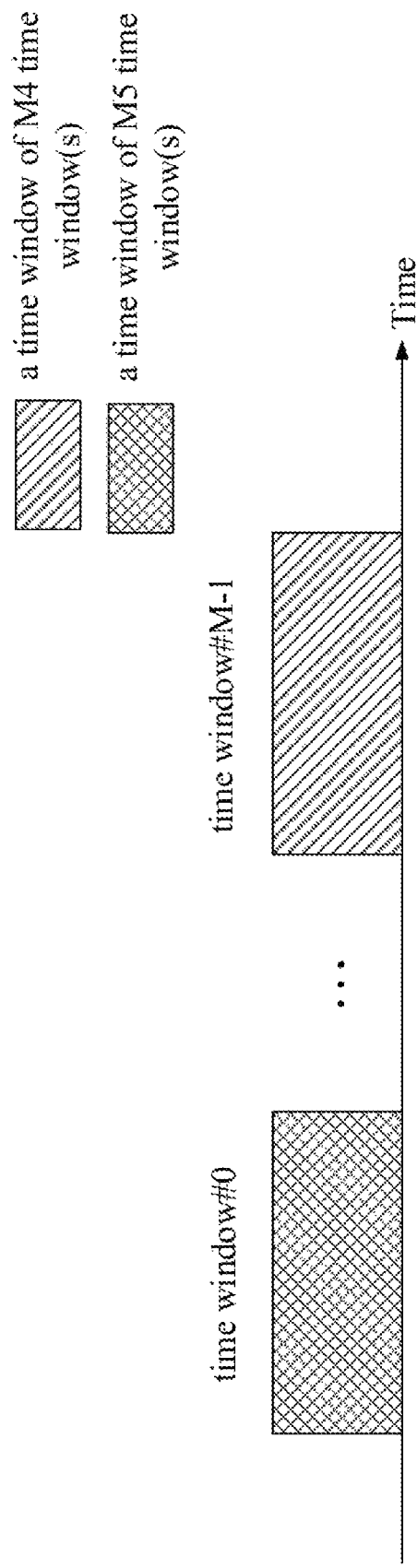
FIG. 16 illustrates a schematic diagram of a relationship between a total number of bits comprised in a first check bit block and a position of a first time window in M time windows according to one embodiment of the present disclosure.

Embodiment 16 illustrates a schematic diagram of a relationship between a total number of bits comprised in a first check bit block and a position of a first time window in M time windows; as shown in FIG. 16.

In Embodiment 16, the first node of the present disclosure transmits the first radio signal of the present disclosure in the first time window, the first time window is any time window of the M time windows. The first radio signal carries the first check bit block, a total number of bits comprised in the first check bit block is related to a position of the first time window in the M time windows. If the first time window is a time window out of M4 time window(s), a total number of bits comprised in the check bit block is equal to a first value; if the first time window is a time window out of M5 time window(s), a total number of bits comprised in the check bit block is equal to a second value; the M4 time window(s) and the M5 time window(s) are two non-intersecting subsets of the M time windows, the M4 and the M5 are respectively positive integers less than the M, the first value and the second value are two positive integers that are mutually unequal.

In FIG. 16, indices for the M time windows are #0 . . . , and #M−1, respectively; a box filled with slashes represents a time window of the M4 time window(s), a box filled with crosses represents a time window of the M5 time window(s).

In one embodiment, if the first time window is a time window of M4 time window(s), a total number of bits comprised in the check bit block is equal to a first value; if the first time window is a time window out of M5 time window(s), a total number of bits comprised in the check bit block is equal to a second value; the M4 time window(s) and the M5 time window(s) are two non-intersecting subsets of the M time windows, the M4 and the M5 are respectively positive integers less than the M, the first value and the second value are two positive integers that are mutually unequal.

In one embodiment, there does not exist a time window of the M time windows that belongs to the M4 time window(s) and the M5 time window(s) simultaneously.

In one embodiment, a sum of the M4 and the M5 is equal to the M.

In one embodiment, the M4 time windows are consecutive in the M time windows, the M5 time windows are consecutive in the M time windows.

In one embodiment, the M4 time windows are non-consecutive in the M time windows, the M5 time windows are non-consecutive in the M time windows.

In one embodiment, the first value and the second value are configured by a higher-layer signaling respectively.

In one embodiment, the first value and the second value are configured by an RRC signaling respectively.

In one embodiment, for the M4 given above, position(s) of the M4 time window(s) in the M time windows is(are) fixed, so there is no need for configuration.

In one embodiment, for the M5 given above, position(s) of the M5 time window(s) in the M time windows is(are) fixed, so there is no need for configuration.

In one embodiment, the M4 is equal to 1.

In one embodiment, the M4 is greater than 1.

In one embodiment, the M5 is equal to 1.

In one embodiment, the M5 is greater than 1.

In one embodiment, the first information in the present disclosure is used for determining the first value and the second value.

In one embodiment, the second information in the present disclosure is used for determining at least one of the M4 time window(s), the M5 time window(s), the M4, or the M5.

EMBODIMENT 17

Figure 17:
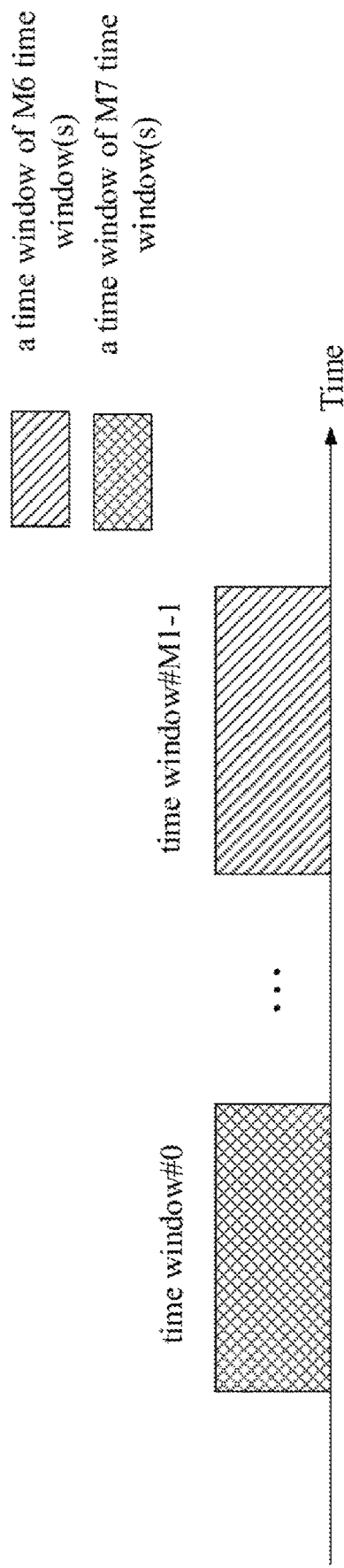
FIG. 17 illustrates a schematic diagram of a relationship between a code rate of a first coding and a position of a second time window in M time windows according to one embodiment of the present disclosure.

Embodiment 17 illustrates a schematic diagram of a relationship between a code rate of a first coding and a position of a second time window in M time windows; as shown in FIG. 17.

In Embodiment 17, the first node of the present disclosure transmits the second radio signal of the present disclosure in the second time window, the second time window is any time window of the M time windows, the M1 time windows are a subset of the M time windows in the present disclosure; the second radio signal carries the first bit block in the present disclosure. A bit block output after the first bit block is subjected to the first coding is used for generating the second radio signal, a code rate of the first coding is related to a position of the second time window in the M1 time windows. If the second time window is a time window out of the M6 time window(s), a code rate of the first coding is a first code rate; if the second time window is a time window out of the M7 time window(s), a code rate of the first coding is a second code rate; the M6 time window(s) and the M7 time window(s) are two non-intersecting subsets of the M1 time windows, the M6 and the M7 are respectively positive integers less than the M1, the first code rate and the second code rate are respectively positive real numbers less than 1, the first code rate is not equal to the second code rate.

In FIG. 17, indices for the M time windows are #0 . . . , and #M−1, respectively; a box filled with slashes represents a time window of the M6 time window(s), a box filled with crosses represents a time window of the M7 time window(s).

In one embodiment, the M1 is equal to the M, a code rate of the first coding is related to a position of the second time window in the M1 time windows.

In one embodiment, the first coding includes channel coding and rate matching.

In one embodiment, channel coding in the first coding is a polar code.

In one embodiment, channel coding in the first coding is a LDPC code.

In one embodiment, the specific method of implementing polar code can be found in 3GPP TS 38.212, chapter 5.3.

In one embodiment, the specific method of implementing LDPC code can be found in 3GPP TS 38.212, chapter 5.3.

In one embodiment, the bit block output after the first bit block is subjected to a first coding is an output bit block of the first coding.

In one embodiment, a total number of bits comprised in a bit block output after the first bit block is subjected to the first coding is not related to a position of the second time window in the M1 time windows.

In one embodiment, a code rate of the first coding is equal to a total number of bits comprised in an input bit block of the first coding divided by a total number of bits comprised in an output bit block of the first coding.

In one embodiment, all bits in the first bit block are sequentially input to a channel encoder corresponding to channel coding in the first coding.

In one embodiment, an input of the first coding is the first bit block.

In one embodiment, an input of the first coding comprises the first bit block and a fourth check bit block, an information corresponding to the fourth check bit block comprises the first bit block.

In one subembodiment of the above embodiment, a total number of bits comprised in the fourth check bit block related to a position of the second time window in the M1 time windows.

In one subembodiment of the above embodiment, a code rate of the first coding is related to a total number of bits comprised in the fourth check bit block.

In one embodiment, an input of the first coding comprises the second bit block and the third check bit block.

In one embodiment, a total number of bits comprised in the third check bit block is related to a position of the second time window in the M1 time windows.

In one embodiment, an input of the first coding comprises the first bit block, the second bit block and the third check bit block.

In one subembodiment of the above embodiment, an information bit block corresponding to the third check bit block comprises the first bit block.

In one embodiment, if the second time window is a time window of the M6 time window(s), a code rate of the first coding is a first code rate; if the second time window is a time window of the M7 time window(s), a code rate of the first coding is a second code rate; the M6 time window(s) and the M7 time window(s) are two non-intersecting subsets of the M1 time windows, the M6 and the M7 are respectively positive integers less than the M1, the first code rate and the second code rate are respectively positive real numbers less than 1, the first code rate is not equal to the second code rate.

In one embodiment, there does not exist a time window of the M1 time windows that belongs to the M6 time window(s) and the M7 time window(s) simultaneously.

In one embodiment, a sum of the M6 and the M7 is equal to the M1.

In one embodiment, the M6 time windows are consecutive in the M1 time windows, the M7 time windows are consecutive in the M1 time windows.

In one embodiment, the M6 time windows are non-consecutive in the M1 time windows, the M7 time windows are non-consecutive in the M1 time windows.

In one embodiment, for the M6 given above, position(s) of the M6 time window(s) in the M1 time windows is(are) fixed, so there is no need for configuration.

In one embodiment, for the M7 given above, position(s) of the M7 time window(s) in the M1 time windows is(are) fixed, so there is no need for configuration.

In one embodiment, the second information in the present disclosure is used for determining at least one of the M6 time window(s), the M7 time window(s), the M6, or the M7.

EMBODIMENT 18

Figure 18:
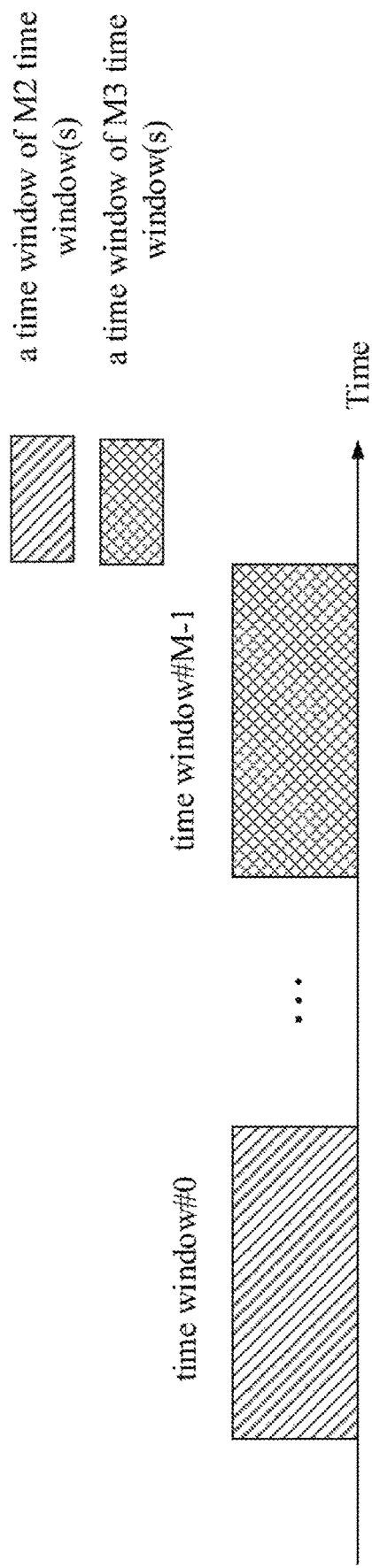
FIG. 18 illustrates a schematic diagram of a relationship between a generation polynomial for a first check bit block and a position of a first time window in M time windows according to one embodiment of the present disclosure.

Embodiment 18 illustrates a schematic diagram of a relationship between a generation polynomial for a first check bit block and a position of a first time window in M time windows; as shown in FIG. 18.

In Embodiment 18, the first node of the present disclosure transmits the first radio signal of the present disclosure in the first time window, the first time window is any time window of the M time windows. The first radio signal carries the first check bit block, a total number of bits comprised in the first check bit block is related to a position of the first time window in the M time windows. If the first time window is a time window out of M2 time window(s), the first generation polynomial is used for generating the first check bit block; if the first time window is a time window out of M3 time window(s), the second generation polynomial is used for generating the first check bit block; the M2 time window(s) and the M3 time window(s) are two non-intersecting subsets of the M time windows, the M2 and the M3 are respectively positive integers less than the M.

In FIG. 18, indices for the M time windows are #0 . . . , and #M−1, respectively; a box filled with slashed represents a time window of the M2 time window(s), a box filled with crosses represents a time window of the M3 time window(s).

In one embodiment, there does not exist a time window of the M time windows that belongs to the M2 time window(s) and the M3 time window(s) simultaneously.

In one embodiment, a sum of the M2 and the M3 is equal to the M.

In one embodiment, the M2 time windows are consecutive in the M time windows, the M3 time windows are consecutive in the M time windows.

In one embodiment, the M2 time windows are non-consecutive in the M time windows, the M3 time windows are non-consecutive in the M time windows.

In one embodiment, for the M2 given above, position(s) of the M2 time window(s) in the M time windows is(are) fixed, so there is no need for configuration.

In one embodiment, for the M3 given above, position(s) of the M3 time window(s) in the M time windows is(are) fixed, so there is no need for configuration.

In one embodiment, the first generation polynomial and the second generation polynomial are CRC Cyclic Generator Polynomials respectively. The specific meaning of the CRC Cyclic Generator Polynomial can be found in 3GPP Technical Specification (TS) 36.212, chapter 5, and 3GPP TS 38.212, chapter 5.

In one embodiment, the first check bit block is generated by a check bit block of a first information bit block, the first information bit block is an information bit block corresponding to the first check bit block, the first information bit block comprises the first bit block in the present disclosure. If the first time window is a time window out of M2 time window(s), the check bit block of the first information bit block is an output after the first information bit block is subjected to the first generation polynomial; if the first time window is a time window out of M3 time window(s), the check bit block of the first information bit block is an output after the first information bit block is subjected to the second generation polynomial.

In one embodiment, the first generation polynomial and the second generation polynomial are respectively configured by a higher-layer signaling.

In one embodiment, the first generation polynomial and the second generation polynomial are respectively configured by an RRC signaling.

In one embodiment, the first generation polynomial and the second generation polynomial correspond to different CRC bit lengths.

In one embodiment, the first generation polynomial and the second generation polynomial correspond to a same CRC bit length.

In one embodiment, the first information in the present disclosure is used for determining the first generation polynomial and the second generation polynomial.

In one embodiment, the second information in the present disclosure is used for determining at least one of the M2 time window(s), the M3 time window(s), the M2, or the M3.

EMBODIMENT 19

Figure 19:
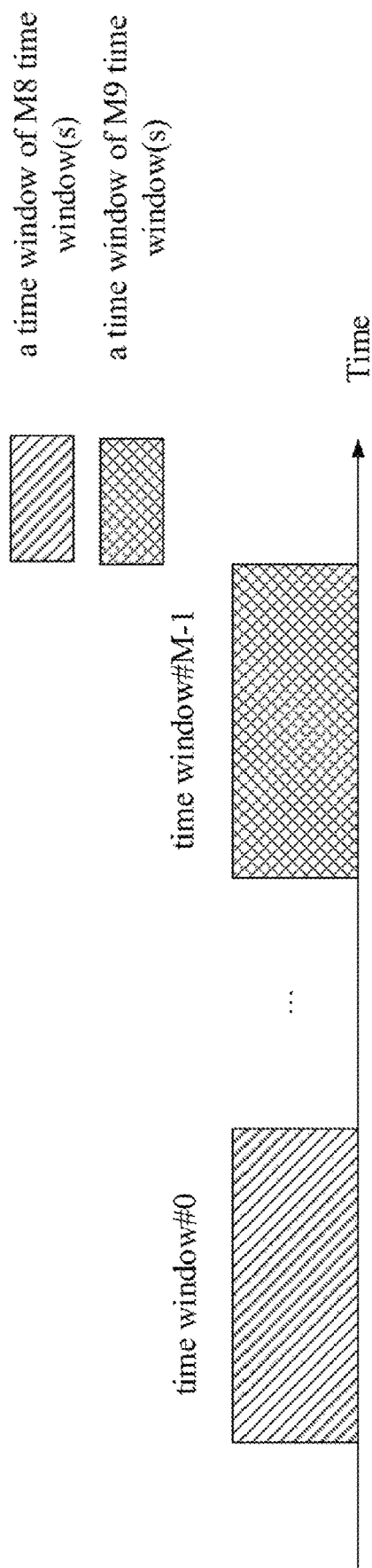
FIG. 19 illustrates a schematic diagram of a relationship between Q check bit sub-block(s) and a position of a first time window in M time windows according to one embodiment of the present disclosure.

Embodiment 19 illustrates a schematic diagram of a relationship between Q check bit sub-block(s) and a position of a first time window in M time windows; as shown in FIG. 19.

In Embodiment 19, the first node of the present disclosure transmits the first radio signal of the present disclosure in the first time window, the first time window is any time window of the M time windows. The first radio signal carries the first check bit block in the present disclosure, the first check bit block comprises Q check bit sub-block(s), the Q is related to a position of the first time window in the M time windows. If the first time window is a time window out of M8 time window(s), the Q is equal to Q1; if the first time window is a time window out of M9 time window(s), the Q is equal to Q2; the M8 time window(s) and the M9 time window(s) are two non-intersecting subsets of the M time windows, the M8 and the M9 are respectively positive integers less than the M; the Q1 and the Q2 are positive integers that are mutually unequal.

In FIG. 19, indices for the M time windows are #0 . . . , and #M−1, respectively; a box filled with slashes represents a time window of the M8 time window(s), a box filled with crosses represents a time window of the M9 time window(s).

In one embodiment, the Q is related to a position of the first time window in the M time windows.

In one embodiment, the Q belongs to a collection of 1 and 2.

In one embodiment, if the first time window is a time window out of M8 time window(s), the Q is equal to Q1; if the first time window is a time window out of M9 time window(s), the Q is equal to Q2; the M8 time window(s) and the M9 time window(s) are two non-intersecting subsets of the M time windows, the M8 and the M9 are respectively positive integers less than the M; the Q1 and the Q2 are positive integers that are mutually unequal.

In one embodiment, a sum of the M8 and the M9 is equal to the M.

In one embodiment, the Q1 is equal to 2.

In one embodiment, the Q2 is equal to 1.

In one embodiment, the M8 time windows are consecutive in the M time windows, the M9 time windows are consecutive in the M time windows.

In one embodiment, the M8 time windows are non-consecutive in the M time windows, the M9 time windows are non-consecutive in the M time windows.

In one embodiment, for the M8 given above, position(s) of the M8 time window(s) in the M time windows is(are) fixed, so there is no need for configuration.

In one embodiment, for the M9 given above, position(s) of the M9 time window(s) in the M time windows is(are) fixed, so there is no need for configuration.

In one embodiment, a target CRC sub-block is a check bit sub-block of the Q check bit sub-block(s); the first check bit block comprises the target CRC sub-block all the time no matter what position of the first time window is in the M time windows.

EMBODIMENT 20

Figure 20:
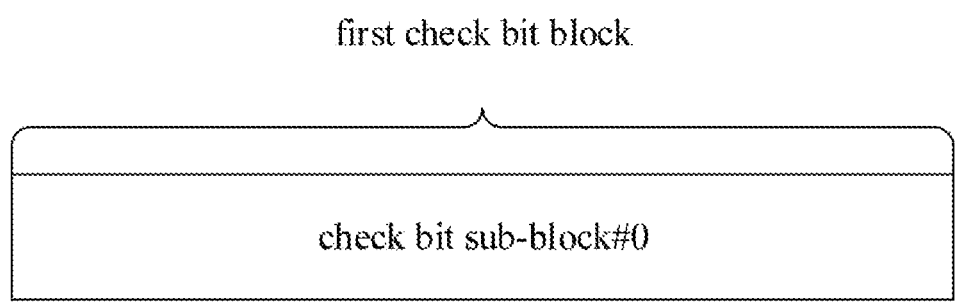
FIG. 20 illustrates a schematic diagram of a first check bit block comprising Q check bit sub-block(s) according to one embodiment of the present disclosure.

Embodiment 20 illustrates a schematic diagram of a first check bit block comprising Q check bit sub-block(s); as shown in FIG. 20.

In Embodiment 20, the first check bit block comprises the Q check bit sub-block(s), the Q is equal to 1. An information bit block corresponding to each check bit sub-block of the Q check bit sub-block(s) comprises the first bit block in the present disclosure. In FIG. 20, an index for the Q check bit sub-block(s) is #0.

In one embodiment, the Q is equal to 1.

In one embodiment, the Q is equal to 1, each check bit sub-block of the Q check bit sub-block(s) is generated by a check bit block of the first bit block.

EMBODIMENT 21

Figure 21:
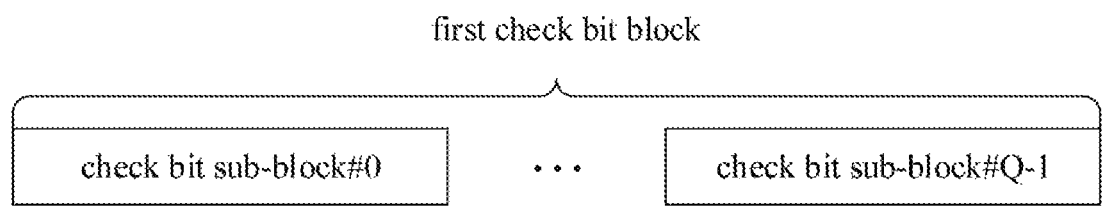
FIG. 21 illustrates a schematic diagram of a first check bit block comprising Q check bit sub-block(s) according to one embodiment of the present disclosure.

Embodiment 21 illustrates a schematic diagram of a first check bit block comprising Q check bit sub-block(s); as shown in FIG. 21.

In Embodiment 21, the first check bit block comprises the Q check bit sub-blocks, the Q is greater than 1. An information bit block corresponding to each check bit sub-block of the Q check bit sub-blocks comprises the first bit block in the present disclosure. In FIG. 21, indices for the Q check bit sub-blocks are #0, . . . , and #Q−1, respectively.

In one embodiment, the Q is greater than 1.

In one embodiment, the Q is equal to 2.

In one embodiment, the Q is equal to 2, the Q check bit sub-blocks comprise a third check bit sub-block and a fourth check bit sub-block. An information bit block corresponding to the third check bit sub-block is the first bit block, an information bit block corresponding to the fourth check bit sub-block are the first bit block and the third check bit sub-block.

In one subembodiment of the above embodiment, the third check bit sub-block is generated by a check bit block of the first bit block.

In one subembodiment of the above embodiment, the fourth check bit sub-block is generated by a check bit block of the first bit block and the third check bit sub-block.

In one subembodiment of the above embodiment, a CRC Cyclic Generator Polynomial for the fourth check bit sub-block is $g_{CRC24C}(D)$, a CRC Cyclic Generator Polynomial for the third check bit sub-block is not $g_{CRC24C}(D)$; the specific meaning of $g_{CDC24C}(D)$ can be found in 3GPP TS 38.212 (V15.1.1), chapter 5.1.

In one subembodiment of the above embodiment, a CRC Cyclic Generator Polynomial for the third check bit sub-block is $g_{CRC24C}(D)$, a CRC Cyclic Generator Polynomial for the fourth check bit sub-block is not $g_{CRC24C}(D)$.

In one reference embodiment of the above subembodiment, a third bit block is generated after the first bit block and the third check bit sub-block are subjected to a first interleaver, a bit block output after the third bit block and the fourth check bit sub-block are subjected to a third channel coding is used for generating the first radio signal in the present disclosure. The third channel coding is a polar code; the specific method of implementing the first interleaver can be found in 3GPP TS 38.212, chapter 5.3.1.1, the specific method of implementing the third channel coding can be found in 3GPP TS 38.212, chapter 5.3.1.2.

In one embodiment, the Q is greater than 1, any two check bit sub-blocks of the Q check bit sub-blocks are generated by distinct CRC Cyclic Generator Polynomials.

In one embodiment, the Q is greater than 1, any two check bit sub-blocks of the Q check bit sub-blocks comprise different numbers of bits.

EMBODIMENT 22

Figure 22:
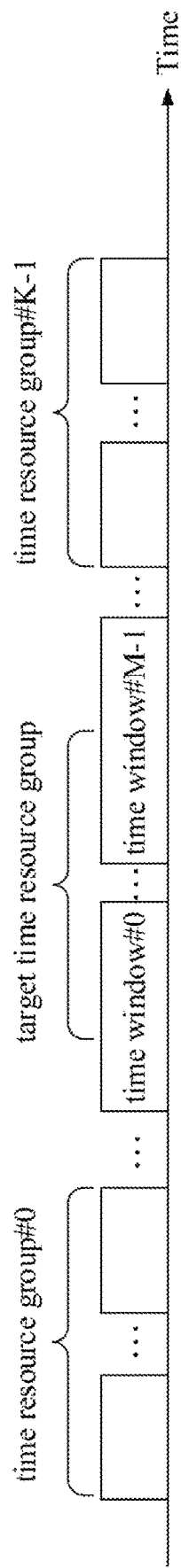
FIG. 22 illustrates a schematic diagram of K time resource group(s) according to one embodiment of the present disclosure.

Embodiment 22 illustrates schematic diagram of K time resource group(s); as shown in FIG. 22.

In Embodiment 22, the first node in the present disclosure repeatedly transmits K radio signal group(s) in K time resource group(s) respectively; wherein any time resource group of the K time resource group(s) comprises a positive integer number of time window(s), any radio signal group of the K radio signal group(s) comprises a positive integer number of radio signal(s); the M time windows in the present disclosure constitute a target time resource group, the target time resource group is a time resource group of the K time resource group(s).

In FIG. 22, indices for the K time resource groups are #0 . . . , and #K−1, respectively, indices for the M time windows are #0 . . . , and #M−1, respectively.

In one embodiment, the first radio signal in the present disclosure is a radio signal of a radio signal group transmitted in the M time windows among the K radio signal group(s).

In one embodiment, the second radio signal in the present disclosure is a radio signal of a radio signal group transmitted in the M time windows among the K radio signal group(s).

In one embodiment, the first node transmits M radio signals in the M time windows respectively, any radio signal group of the K radio signal group(s) is a repetition of the M radio signals.

In one embodiment, the first node transmits M radio signals in the M time windows respectively, any radio signal group of the K radio signal group(s) consists of a repetition of the M radio signals.

In one embodiment, any two time resource groups of the K time resource groups comprise an equal number of time window(s).

In one embodiment, any two time resource groups of the K time resource groups comprise an equal number of time window(s), which is the M.

In one embodiment, time resources occupied by the K time resource group(s) are mutually orthogonal (non-overlapping).

In one embodiment, all time windows in any time resource group of the K time resource group(s) are mutually orthogonal (non-overlapping) in time domain.

In one embodiment, the K is equal to 1.

In one embodiment, the K is greater than 1.

In one embodiment, the second node in the present disclosure performs combination on radio signals carrying the first bit block in the present disclosure among the K radio signal group(s) received, and recovers the first bit block from a combined signal.

In one embodiment, the second node performs symbol-level combination on repeatedly transmitted (same) radio signals of the K radio signal group(s), the second node performs bit-level combination on distinct radio signals carrying the first bit block of the K radio signal group(s).

In one embodiment, the second node in the present disclosure performs combination on radio signals carrying the first check bit block in the present disclosure among the K radio signal group(s) received, and recovers the CRC first bit block from a combined signal.

In one subembodiment of the above embodiment, the combination is a symbol-level combination.

EMBODIMENT 23

Figure 23:
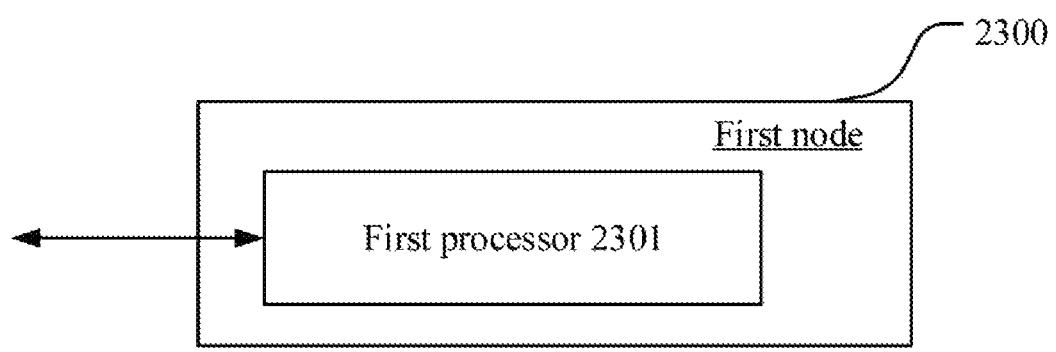
FIG. 23 illustrates a structure block diagram of a processing device in a first node according to one embodiment of the present disclosure.

Embodiment 23 illustrates a structure block diagram of a processing device in a first node; as shown in FIG. 23. In FIG. 23, a processing device 2300 in a first node mainly comprises a first processor 2301.

In Embodiment 23, a first processor 2301 transmits a first radio signal in a first time window.

In Embodiment 23, the first time window is any time window out of M time windows, the first radio signal carries a first check bit block; wherein an information bit block corresponding to the first check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

In one embodiment, the first processor 2301 transmits a second radio signal in a second time window, the second time window is any time window of the M1 time window(a), the second radio signal carries the first bit block; wherein the M1 time window(s) is(are) a subset of the M time windows, the M1 is a positive integer not greater than the M.

In one embodiment, the second radio signal carries a second bit block and a third check bit block, an information bit block corresponding to the third check bit block comprise the second bit block, the first check bit block is not related to the second bit block.

In one embodiment, a bit block output after the first bit block is subjected to a first coding is used for generating the second radio signal, a code rate of the first coding is related to a position of the second time window in the M1 time window(s).

In one embodiment, a first post-coding bit block is acquired after a third coding of a first pre-coding bit block, the first pre-coding bit block comprises the first bit block and the first check bit block, the first post-coding bit block comprises a first post-coding bit sub-block and a second post-coding bit sub-block; the first check bit block comprises a first check bit sub-block and a second check bit sub-block, the first post-coding bit sub-block is not related to the second check bit sub-block; the first post-coding bit sub-block and the second post-coding bit sub-block are used for generating the first radio signal and the second radio signal respectively.

In one embodiment, the M1 is less than the M, the first processor 2301 only transmits a radio signal carrying the first bit block in the M1 time window(s) out of the M time windows.

In one embodiment, if the first time window is a time window out of M2 time window(s), a first generation polynomial is used for generating the first check bit block; if the first time window is a time window out of M3 time window(s), a second generation polynomial is used for generating the first check bit block; the M2 time window(s) and the M3 time window(s) are two subsets of the M time windows not intersected with each other, the M2 and the M3 are positive integers less than the M, respectively.

In one embodiment, the first check bit block comprises Q check bit sub-block(s), an information bit block corresponding to each check bit sub-block out of the Q check bit sub-block(s) comprises the first bit block; the Q is a positive integer.

In one embodiment, the first processor 2301 repeatedly transmits K radio signal group(s) in K time resource group(s) respectively; wherein any time resource group of the K time resource group(s) comprises a positive integer number of time window(s), any radio signal group of the K radio signal group(s) comprises a positive integer number of radio signal(s); the M time windows are a time resource group of the K time resource group(s); the K is a positive integer.

In one embodiment, the first processor 2301 receives first information; wherein the first information is used for determining the K time resource group(s).

In one embodiment, the first processor 2301 transmits first information; wherein the first information is used for determining the K time resource group(s).

In one embodiment, the first processor 2301 receives second information; wherein the second information is used for determining at least one of the M and the M1.

In one embodiment, the first processor 2301 transmits second information; wherein the second information is used for determining at least one of the M and the M1.

In one embodiment, a device in the first node is a UE.

In one embodiment, a device in the first node is a base station.

In one embodiment, a device in the first node is a UE, the first processor 2301 receives the first information.

In one embodiment, a device in the first node is a UE, the first processor 2301 receives the second information.

In one embodiment, a device in the first node is a base station, the first processor 2301 transmits the first information.

In one embodiment, a device in the first node is a base station, the first processor 2301 transmits the second information.

In one embodiment, the first processor 2301 comprises at least one of an antenna 452, a transmitter/receiver 454, a transmitting processor 468, a receiving processor 456, a channel encoder 457, a channel decoder 458, a controller/processor 459, a memory 460, or a data source 467 in Embodiment 4, a device in the first node is a UE.

In one embodiment, the first processor 2301 comprises at least one of an antenna 420, a transmitter 418, a transmitting processor 416, a channel encoder 477, a controller/processor 475, or a memory 476 in Embodiment 4, a device in the first node is a base station.

EMBODIMENT 24

Figure 24:
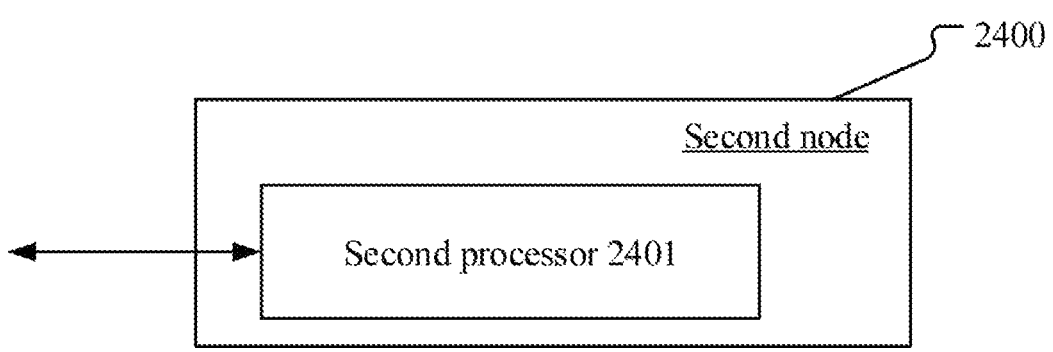
FIG. 24 illustrates a structure block diagram of a processing device in a second node according to one embodiment of the present disclosure.

Embodiment 24 illustrates a structure block diagram of a processing device in a second node; as shown in FIG. 24. In FIG. 24, a processing device 2400 in a second node mainly comprises a second processor 2401.

In Embodiment 24, a second processor 2401 receives a first radio signal in a first time window.

In Embodiment 24, the first time window is any time window out of M time windows, the first radio signal carries a first check bit block; wherein an information bit block corresponding to the first check bit block comprises a first bit block; values of bits comprised in the first check bit block are related to a position of the first time window in the M time windows, or, a total number of bits comprised in the first check bit block is related to a position of the first time window in the M time windows; the first bit block is not related to a position of the first time window in the M time windows, the M is a positive integer greater than 1.

In one embodiment, the second processor 2401 receives a second radio signal in a second time window, the second time window is any time window of the M1 time window(a), the second radio signal carries the first bit block; wherein the M1 time window(s) is(are) a subset of the M time windows, the M1 is a positive integer not greater than the M.

In one embodiment, the second radio signal carries a second bit block and a third check bit block, an information bit block corresponding to the third check bit block comprises the second bit block, the first check bit block is not related to the second bit block.

In one embodiment, a bit block output after the first bit block is subjected to a first coding is used for generating the second radio signal, a code rate of the first coding is related to a position of the second time window in the M1 time window(s).

In one embodiment, a first post-coding bit block is acquired after a third coding of a first pre-coding bit block, the first pre-coding bit block comprises the first bit block and the first check bit block, the first post-coding bit block comprises a first post-coding bit sub-block and a second post-coding bit sub-block; the first check bit block comprises a first check bit sub-block and a second check bit sub-block, the first post-coding bit sub-block is not related to the second check bit sub-block; the first post-coding bit sub-block and the second post-coding bit sub-block are used for generating the first radio signal and the second radio signal respectively.

In one embodiment, the M1 is less than the M, the first processor 2401 only receives a radio signal carrying the first bit block in the M1 time window(s) out of the M time windows.

In one embodiment, if the first time window is a time window out of M2 time window(s), a first generation polynomial is used for generating the first check bit block; if the first time window is a time window out of M3 time window(s), a second generation polynomial is used for generating the first check bit block; the M2 time window(s) and the M3 time window(s) are two subsets of the M time windows not intersected with each other, the M2 and the M3 are positive integers less than the M, respectively.

In one embodiment, the first check bit block comprises Q check bit sub-block(s), an information bit block corresponding to each check bit sub-block out of the Q check bit sub-block(s) comprises the first bit block; the Q is a positive integer.

In one embodiment, the first processor 2401 receives repeatedly transmitted K radio signal group(s) in K time resource group(s) respectively; wherein any time resource group of the K time resource group(s) comprises a positive integer number of time window(s), any radio signal group of the K radio signal group(s) comprises a positive integer number of radio signal(s); the M time windows are a time resource group of the K time resource group(s); the K is a positive integer.

In one embodiment, the second processor 2401 transmits first information; wherein the first information is used for determining the K time resource group(s).

In one embodiment, the second processor 2401 receives first information; wherein the first information is used for determining the K time resource group(s).

In one embodiment, the second processor 2401 transmits second information; wherein the second information is used for determining at least one of the M and the M1.

In one embodiment, the second processor 2401 receives second information; wherein the second information is used for determining at least one of the M and the M1.

In one embodiment, a device in the second node is a base station.

In one embodiment, a device in the second node is a UE.

In one embodiment, a device in the second node is a UE, the second processor 2401 receives the first information.

In one embodiment, a device in the second node is a UE, the second processor 2401 receives the second information.

In one embodiment, a device in the second node is a base station, the second processor 2401 transmits the first information.

In one embodiment, a device in the second node is a base station, the second processor 2401 transmits the second information.

In one embodiment, the second processor 2401 comprises at least one of an antenna 452, a receiver 454, a receiving processor 456, a channel decoder 458, a controller/processor 459, a memory 460, or a data source 467 in Embodiment 4, a device in the second node is a UE.

In one embodiment, the second processor 2401 comprises at least one of an antenna 420, a transmitter/receiver 418, a transmitting processor 416, a receiving processor 470, a channel encoder 477, a channel decoder 478, a controller/processor 475, or a memory 476 in Embodiment 4, a device in the second node is a base station.

EMBODIMENT 25

Figure 25:
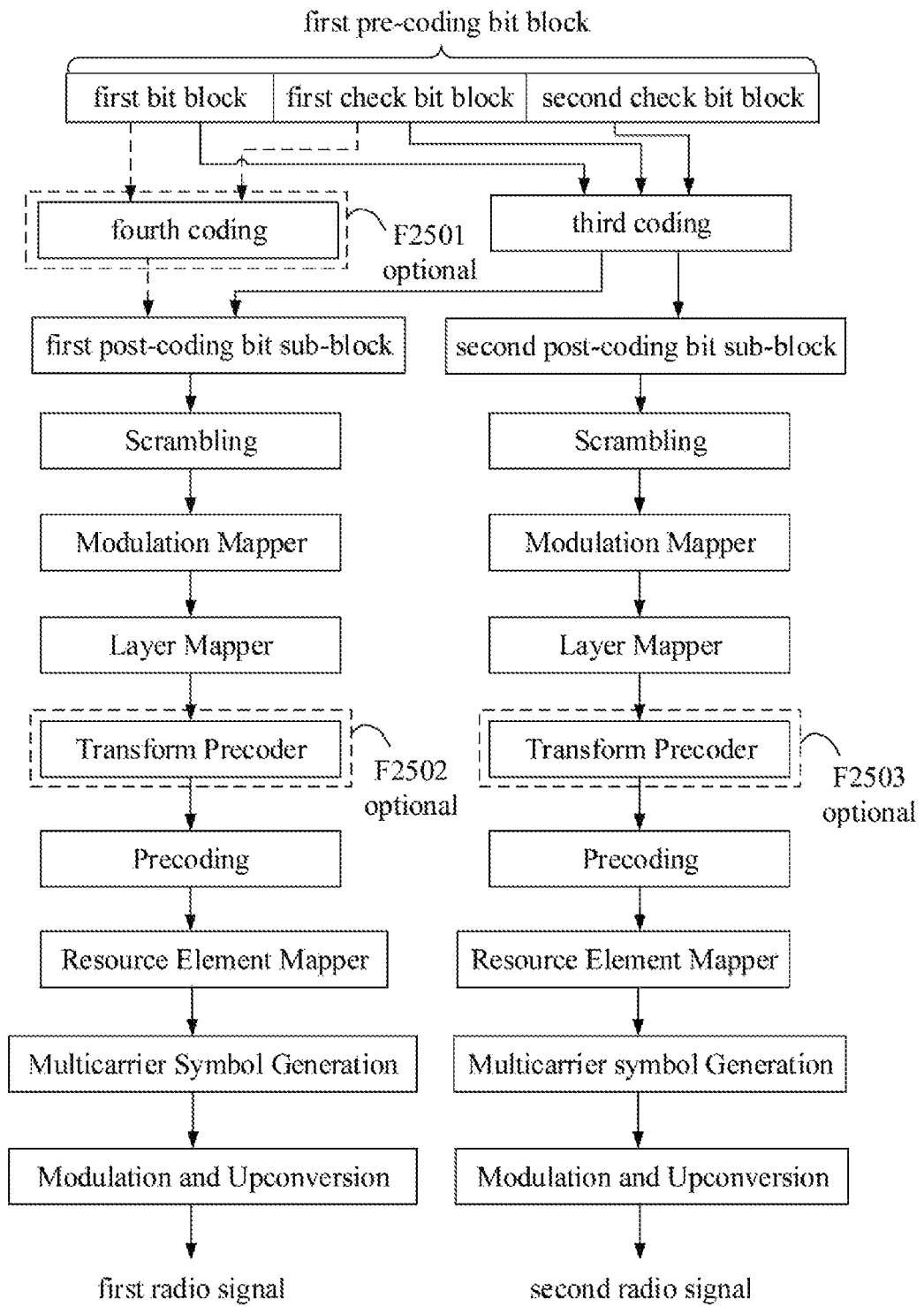
FIG. 25 illustrates a schematic diagram of a first post-coding bit sub-block and a second post-coding bit sub-block used for generating a first radio signal and a second radio signal respectively according to one embodiment of the present disclosure.

Embodiment 25 illustrates a schematic diagram of a first post-coding bit sub-block and a second post-coding bit sub-block used for generating a first radio signal and a second radio signal respectively, as shown in FIG. 25.

In Embodiment 25, the first post-coding bit block in the present disclosure is acquired after the third coding in the present disclosure of the first pre-coding bit block in the present disclosure; the first pre-coding bit block comprises the first bit block and the first check bit block in the present disclosure; the first post-coding bit block comprises the first post-coding bit sub-block and the second post-coding bit sub-block; the first check bit block comprises a first check bit sub-block and a second check bit sub-block, the first post-coding bit sub-block is not related to the second check bit sub-block; the first post-coding bit sub-block and the second post-coding bit sub-block are used for generating the first radio signal and the second radio signal respectively. In FIG. 25, processing steps in dotted boxes F2501, F2502 and F2503 are optional, respectively.

In one embodiment, the first radio signal is an output after the first post-coding bit sub-block is sequentially subjected to part of or all processes of scrambling, a modulation mapper, a layer mapper, a transform precoder, precoding, a resource element mapper, multicarrier symbol generation, and modulation and upconversion.

In one embodiment, the second radio signal is an output after the second post-coding bit sub-block is sequentially subjected to part of or all processes of scrambling, a modulation mapper, a layer mapper, a transform precoder, precoding, a resource element mapper, multicarrier symbol generation, and modulation and upconversion.

In one embodiment, the first post-coding bit sub-block and the second post-coding bit sub-block constitute the first post-coding bit block.

In one embodiment, the first post-coding bit sub-block is related to the first check bit sub-block.

In one embodiment, the second post-coding bit sub-block is related to the second check bit sub-block.

In one embodiment, the third coding is based on a polar code.

In one embodiment, the third coding comprises channel coding and rate matching.

In one embodiment, the third coding is based on a LDPC code.

In one embodiment, the first post-coding bit sub-block is acquired after a fourth coding of a second pre-coding bit block, the second pre-coding bit block comprises the first bit block and the first check bit sub-block, the second pre-coding bit block does not comprise the second check bit sub-block.

In one subembodiment of the above embodiment, the fourth coding is based on a polar code.

In one subembodiment of the above embodiment, the fourth coding comprises channel coding and rate matching.

In one subembodiment of the above embodiment, the fourth coding is based on a LDPC code.

In one subembodiment of the above embodiment, the second pre-coding bit block consists the first bit block and the first check bit sub-block.

EMBODIMENT 26

Figure 26:
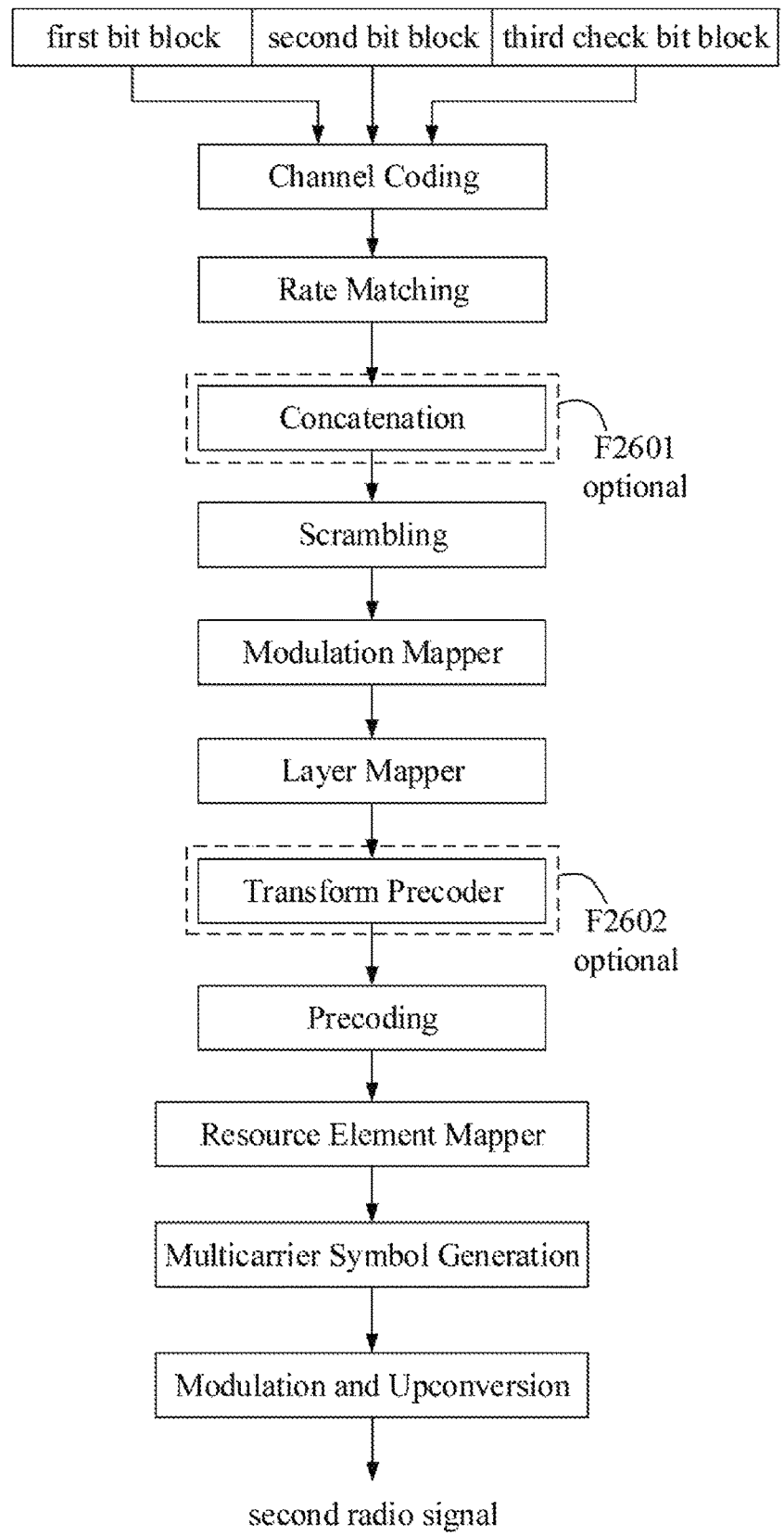
FIG. 26 illustrates a schematic diagram of a second radio signal carrying a second bit block and a third check bit block according to one embodiment of the present disclosure.

Embodiment 26 illustrates a schematic diagram of a second radio signal carrying a second bit block and a third check bit block; as shown in FIG. 26.

In Embodiment 26, the first node of the present disclosure transmits the second radio signal in the second time window of the present disclosure, the second time window is any time window out of the M time windows, the M1 time window(s) is(are) a subset of the M time windows in the present disclosure. The second radio signal carries the first bit block, the second bit block and the third check bit block, an information bit block corresponding to the third check bit block comprises the second bit block. The second radio signal is an output after all bits in the first bit block, the second bit block and the third check bit block are sequentially subjected to part of or all processes of channel coding, rate matching, concatenation, scrambling, a modulation mapper, a layer mapper, a transform precoder, precoding, a resource element mapper, multicarrier symbol generation, and modulation and upconversion. In FIG. 26, processing steps in dotted boxes F2601 and F2602 are optional, respectively.

In one embodiment, an information corresponding to the third check bit block comprises the first bit block.

In one embodiment, an information corresponding to the third check bit block does not comprise the first bit block.

In one embodiment, the first bit block and the second bit block constitute an information bit block corresponding to the third check bit block.

In one embodiment, the phrase that the second radio signal carries a second bit block and a third check bit block refers to: the second radio signal is an output after all bits in the second bit block and the third check bit block are sequentially subjected to part of or all processes of channel coding, rate matching, concatenation, scrambling, a modulation mapper, a layer mapper, a transform precoder, precoding, a resource element mapper, multicarrier symbol generation, and modulation and upconversion.

In one embodiment, the third check bit block is generated by a check bit block of the second bit block.

In one embodiment, the third check bit block is generated by a check bit block of the first bit block and the second bit block.

In one embodiment, values of bits comprised in the third check bit block are related to a position of the second time window in the M1 time window(s).

In one embodiment, a total number of bits comprised in the third check bit block is related to a position of the second time window in the M1 time window(s).

In one embodiment, values of bits comprised in the third check bit block are related to a position of the second time window in the M1 time window(s), and a total number of bits comprised in the third check bit block is related to a position of the second time window in the M1 time window(s).

In one embodiment, values of bits comprised in the third check bit block are not related to a position of the second time window in the M1 time window(s).

In one embodiment, a total number of bits comprised in the third check bit block is not related to a position of the second time window in the M1 time window(s).

In one embodiment, the first coding in the present disclosure includes channel coding and rate matching in FIG. 26.

In one embodiment, channel coding and rate matching in FIG. 26 constitute the first coding in the present disclosure.

In one embodiment, an input of the first coding comprises the first bit block, the second bit block and the third check bit block.

In one embodiment, the third coding in the present disclosure includes channel coding and rate matching in FIG. 26.

In one embodiment, channel coding and rate matching in FIG. 26 constitute the third coding in the present disclosure.

In one embodiment, an input of the third coding comprises the first bit block, the second bit block and the third check bit block.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communication, comprising:

transmitting a first radio signal in a first time window, the first time window is any time window out of M time windows, the first radio signal carries a first check bit block;

wherein an information bit block corresponding to the first check bit block comprises a first bit block; the first check bit block is a CRC (Cyclic Redundancy Check) bit block of the first bit block, or the first check bit block is a bit block after a CRC bit block of the first bit block is subject to scrambling; an output after the first check bit block subjected to channel coding is used to generate the first radio signal; values of bits comprised in the first check bit block are related to a position of the first time window in the M time windows, or, a total number of bits comprised in the first check bit block is related to a position of the first time window in the M time windows; the first bit block is not related to the position of the first time window in the M time windows, the M is a positive integer greater than 1.

2. The method according to claim 1, comprising:
transmitting a second radio signal in a second time window, the second time window is any time window out of M1 time window(s), the second radio signal carries the first bit block, wherein the M1 time window(s) is(are) a subset of the M time windows, the M1 is a positive integer not greater than the M;
or, comprising:
transmitting a second radio signal in a second time window, the second time window is any time window out of M1 time window(s), the second radio signal carries the first bit block, wherein the M1 time window(s) is(are) a subset of the M time windows, the M1 is a positive integer not greater than the M, the second radio signal carries a second bit block and a third check bit block, an information bit block corresponding to the third check bit block comprises the second bit block, the first check bit block is not related to the second bit block;
or, comprising:
transmitting a second radio signal in a second time window, the second time window is any time window out of M1 time window(s), the second radio signal carries the first bit block, wherein the M1 time window(s) is(are) a subset of the M time windows, the M1 is a positive integer not greater than the M, a bit block output after the first bit block is subjected to a first coding is used for generating the second radio signal, a code rate of the first coding is related to a position of the second time window in the M1 time window(s);
or, comprising:
transmitting a second radio signal in a second time window, the second time window is any time window out of M1 time window(s), the second radio signal carries the first bit block, wherein the M1 time window(s) is(are) a subset of the M time windows, the M1 is a positive integer not greater than the M, a first post-coding bit block is acquired after a first pri-coding bit block is subjected to a third coding, the first pri-coding bit block comprises the first bit block and the first check bit block, the first post-coding bit block comprises a first post-coding bit sub-block and a second post-coding bit sub-block, the first check bit block comprises a first check bit sub-block and a second check bit sub-block, the first post-coding bit sub-block is not related to the second check bit sub-block, the first post-coding bit sub-block and the second post-coding bit sub-block are used for generating the first radio signal and the second radio signal respectively;
or, comprising:
transmitting a second radio signal in a second time window, the second time window is any time window out of M1 time window(s), the second radio signal carries the first bit block, wherein the M1 time window(s) is(are) a subset of the M time windows, the M1 is a positive integer less than the M, the first node transmits (a) radio signal(s) carrying the first bit block only in the M1 time window(s) out of the M time windows.

3. The method according to claim 2, comprising:
receiving second information, or, transmitting second information;
wherein the second information is used for determining at least one of the M and the M1.

4. The method according to claim 1, wherein if the first time window is a time window out of M2 time window(s), a first generation polynomial is used for generating the first check bit block, if the first time window is a time window out of M3 time window(s), a second generation polynomial is used for generating the first check bit block, the M2 time window(s) and the M3 time window(s) are two subsets of the M time windows not intersected with each other, the M2 and the M3 are positive integers less than the M, respectively.

5. The method according to claim 1, wherein the first check bit block comprises Q check bit sub-block(s), an information bit block corresponding to each check bit sub-block of the Q check bit sub-block(s) comprises the first bit block, the Q is a positive integer;
or, the first node is a User Equipment (UE) or a base station;
or, comprising:
repeatedly transmitting K radio signal group(s) in K time resource group(s) respectively, wherein any time resource group of the K time resource group(s) comprises a positive integer number of time window(s), any radio signal group of the K radio signal group(s) comprises a positive integer number of radio signal(s), the M time windows are a time resource group of the K time resource group(s), the K is a positive integer;
or, comprising:
repeatedly transmitting K radio signal group(s) in K time resource group(s) respectively,
receiving first information or transmitting first information,
wherein any time resource group of the K time resource group(s) comprises a positive integer number of time window(s), any radio signal group of the K radio signal group(s) comprises a positive integer number of radio signal(s), the M time windows are a time resource group of the K time resource group(s), the K is a positive integer, the first information is used for determining the K time resource group(s).

6. A method in a second node for wireless communication, comprising:
receiving a first radio signal in a first time window, the first time window is any time window out of M time windows, the first radio signal carries a first check bit block;
wherein an information bit block corresponding to the first check bit block comprises a first bit block; the first check bit block is a CRC (Cyclic Redundancy Check) bit block of the first bit block, or the first check bit block is a bit block after a CRC bit block of the first bit block is subject to scrambling; an output after the first check bit block is subjected to channel coding is used to generate the first radio signal; values of bits comprised in the first check bit block are related to a position of the first time window in the M time windows, or, a total number of bits comprised in the first check bit block is related to a position of the first time window in the M time windows; the first bit block is not related to the position of the first time window in the M time windows, the M is a positive integer greater than 1.

7. The method according to claim 6, comprising:
receiving a second radio signal in a second time window, the second time window is any time window out of M1 time window(s), the second radio signal carries the first bit block, wherein the M1 time window(s) is(are) a subset of the M time windows, the M1 is a positive integer not greater than the M;

or, comprising:
receiving a second radio signal in a second time window, the second time window is any time window out of M1 time window(s), the second radio signal carries the first bit block, wherein the M1 time window(s) is(are) a subset of the M time windows, the M1 is a positive integer not greater than the M, the second radio signal carries a second bit block and a third check bit block, an information bit block corresponding to the third check bit block comprises the second bit block, the first check bit block is not related to the second bit block;

or, comprising:
receiving a second radio signal in a second time window, the second time window is any time window out of M1 time window(s), the second radio signal carries the first bit block, wherein the M1 time window(s) is(are) a subset of the M time windows, the M1 is a positive integer not greater than the M, a bit block output after the first bit block is subjected to a first coding is used for generating the second radio signal, a code rate of the first coding is related to a position of the second time window in the M1 time window(s);

or, comprising:
receiving a second radio signal in a second time window, the second time window is any time window out of M1 time window(s), the second radio signal carries the first bit block, wherein the M1 time window(s) is(are) a subset of the M time windows, the M1 is a positive integer not greater than the M, a first post-coding bit block is acquired after a first pri-coding bit block is subjected to a third coding, the first pri-coding bit block comprises the first bit block and the first check bit block, the first post-coding bit block comprises a first post-coding bit sub-block and a second post-coding bit sub-block, the first check bit block comprises a first check bit sub-block and a second check bit sub-block, the first post-coding bit sub-block is not related to the second check bit sub-block, the first post-coding bit sub-block and the second post-coding bit sub-block are used for generating the first radio signal and the second radio signal respectively;

or, comprising:
receiving a second radio signal in a second time window, the second time window is any time window out of M1 time window(s), the second radio signal carries the first bit block, wherein the M1 time window(s) is(are) a subset of the M time windows, the M1 is a positive integer less than the M, the second node receives (a) radio signal(s) carrying the first bit block only in the M1 time window(s) out of the M time windows.

8. The method according to claim 7, comprising:
transmitting second information, or, receiving second information;
wherein the second information is used for determining at least one of the M and the M1.

9. The method according to claim 6, wherein if the first time window is a time window out of M2 time window(s), a first generation polynomial is used for generating the first check bit block, if the first time window is a time window out of M3 time window(s), a second generation polynomial is used for generating the first check bit block, the M2 time window(s) and the M3 time window(s) are two subsets of the M time windows not intersected with each other, the M2 and the M3 are positive integers less than the M, respectively.

10. The method according to claim 6, wherein the first check bit block comprises Q check bit sub-block(s), an information bit block corresponding to each check bit sub-block of the Q check bit sub-block(s) comprises the first bit block, the Q is a positive integer;

or, the second node is a UE or a base station;

or, comprising:
receiving repeatedly transmitted K radio signal group(s) in K time resource group(s) respectively, wherein any time resource group of the K time resource group(s) comprises a positive integer number of time window(s), any radio signal group of the K radio signal group(s) comprises a positive integer number of radio signal(s), the M time windows are a time resource group of the K time resource group(s), the K is a positive integer;

or, comprising:
receiving repeatedly transmitted K radio signal group(s) in K time resource group(s) respectively,
transmitting first information or receiving first information,
wherein any time resource group of the K time resource group(s) comprises a positive integer number of time window(s), any radio signal group of the K radio signal group(s) comprises a positive integer number of radio signal(s), the M time windows are a time resource group of the K time resource group(s), the K is a positive integer, the first information is used for determining the K time resource group(s).

11. A device in a first node for wireless communication, comprising:
a first processor, transmitting a first radio signal in a first time window, the first time window is any time window out of M time windows, the first radio signal carries a first check bit block;
wherein an information bit block corresponding to the first check bit block comprises a first bit block; the first check bit block is a CRC (Cyclic Redundancy Check) bit block of the first bit block, or the first check bit block is a bit block after a CRC bit block of the first bit block is subject to scrambling; an output after the first check bit block is subjected to channel coding is used to generate the first radio signal; values of bits comprised in the first check bit block are related to a position of the first time window in the M time windows, or, a total number of bits comprised in the first check bit block is related to a position of the first time window in the M time windows; the first bit block is not related to the position of the first time window in the M time windows, the M is a positive integer greater than 1.

12. The device in a first node according to claim 11, wherein the first processor transmits a second radio signal in a second time window, the second time window is any time window out of M1 time window(s), the second radio signal carries the first bit block, wherein the M1 time window(s) is(are) a subset of the M time windows, the M1 is a positive integer not greater than the M;

or, the first processor transmits a second radio signal in a second time window, the second time window is any time window out of M1 time window(s), the second radio signal carries the first bit block, wherein the M1 time window(s) is(are) a subset of the M time windows, the M1 is a positive integer not greater than the M, the second radio signal carries a second bit block and a third check bit block, an information bit block corresponding to the third check bit block comprises the second bit block, the first check bit block is not related to the second bit block;

or, the first processor transmits a second radio signal in a second time window, the second time window is any time window out of M1 time window(s), the second radio signal carries the first bit block, wherein the M1 time window(s) is(are) a subset of the M time windows, the M1 is a positive integer not greater than the M, a bit block output after the first bit block is subjected to a first coding is used for generating the second radio signal, a code rate of the first coding is related to a position of the second time window in the M1 time window(s);

or, the first processor transmits a second radio signal in a second time window, the second time window is any time window out of M1 time window(s), the second radio signal carries the first bit block, wherein the M1 time window(s) is(are) a subset of the M time windows, the M1 is a positive integer not greater than the M, a first post-coding bit block is acquired after a first pri-coding bit block is subjected to a third coding, the first pri-coding bit block comprises the first bit block and the first check bit block, the first post-coding bit block comprises a first post-coding bit sub-block and a second post-coding bit sub-block, the first check bit block comprises a first check bit sub-block and a second check bit sub-block, the first post-coding bit sub-block is not related to the second check bit sub-block, the first post-coding bit sub-block and the second post-coding bit sub-block are used for generating the first radio signal and the second radio signal respectively;

or, the first processor transmits a second radio signal in a second time window, the second time window is any time window out of M1 time window(s), the second radio signal carries the first bit block, wherein the M1 time window(s) is(are) a subset of the M time windows, the M1 is a positive integer less than the M, the first node transmits (a) radio signal(s) carrying the first bit block only in the M1 time window(s) out of the M time windows.

13. The device in a first node according to claim 12, wherein the first processor receives second information or transmits second information; wherein the second information is used for determining at least one of the M and the M1.

14. The device in a first node according to claim 11, wherein if the first time window is a time window out of M2 time window(s), a first generation polynomial is used for generating the first check bit block, if the first time window is a time window out of M3 time window(s), a second generation polynomial is used for generating the first check bit block, the M2 time window(s) and the M3 time window(s) are two subsets of the M time windows not intersected with each other, the M2 and the M3 are positive integers less than the M, respectively.

15. The device in a first node according to claim 11, wherein the first check bit block comprises Q check bit sub-block(s), an information bit block corresponding to each check bit sub-block of the Q check bit sub-block(s) comprises the first bit block, the Q is a positive integer;

or, the first node is a UE or a base station;

or, the first processor repeatedly transmits K radio signal group(s) in K time resource group(s) respectively, wherein any time resource group of the K time resource group(s) comprises a positive integer number of time window(s), any radio signal group of the K radio signal group(s) comprises a positive integer number of radio signal(s), the M time windows are a time resource group of the K time resource group(s), the K is a positive integer;

or, the first processor repeatedly transmits K radio signal group(s) in K time resource group(s) respectively, and receives first information or transmits first information, wherein any time resource group of the K time resource group(s) comprises a positive integer number of time window(s), any radio signal group of the K radio signal group(s) comprises a positive integer number of radio signal(s), the M time windows are a time resource group of the K time resource group(s), the K is a positive integer, the first information is used for determining the K time resource group(s).

16. A device in a second node for wireless communication, comprising:
a second processor, receiving a first radio signal in a first time window, the first time window is any time window out of M time windows, the first radio signal carries a first check bit block;
wherein an information bit block corresponding to the first check bit block comprises a first bit block; the first check bit block is a CRC (Cyclic Redundancy Check) bit block of the first bit block, or the first check bit block is a bit block after a CRC bit block of the first bit block is subject to scrambling; an output after the first check bit block is subjected to channel coding is used to generate the first radio signal; values of bits comprised in the first check bit block are related to a position of the first time window in the M time windows, or, a total number of bits comprised in the first check bit block is related to a position of the first time window in the M time windows; the first bit block is not related to the position of the first time window in the M time windows, the M is a positive integer greater than 1.

17. The device in a second node according to claim 16, wherein the second processor receives a second radio signal in a second time window, the second time window is any time window out of M1 time window(s), the second radio signal carries the first bit block, wherein the M1 time window(s) is(are) a subset of the M time windows, the M1 is a positive integer not greater than the M;

or, the second processor receives a second radio signal in a second time window, the second time window is any time window out of M1 time window(s), the second radio signal carries the first bit block, wherein the M1 time window(s) is(are) a subset of the M time windows, the M1 is a positive integer not greater than the M, the second radio signal carries a second bit block and a third check bit block, an information bit block corresponding to the third check bit block comprises the second bit block, the first check bit block is not related to the second bit block;

or, the second processor receives a second radio signal in a second time window, the second time window is any time window out of M1 time window(s), the second radio signal carries the first bit block, wherein the M1 time window(s) is(are) a subset of the M time windows, the M1 is a positive integer not greater than the M, a bit block output after the first bit block is subjected to a first coding is used for generating the second radio signal, a code rate of the first coding is related to a position of the second time window in the M1 time window(s);

or, the second processor receives a second radio signal in a second time window, the second time window is any time window out of M1 time window(s), the second radio signal carries the first bit block, wherein the M1 time window(s) is(are) a subset of the M time windows, the M1 is a positive integer not greater than the M, a first post-coding bit block is acquired after a first pri-coding bit block is subjected to a third coding, the first pri-coding bit block comprises the first bit block and the first check bit block, the first post-coding bit block comprises a first post-coding bit sub-block and a second post-coding bit sub-block, the first check bit block comprises a first check bit sub-block and a second check bit sub-block, the first post-coding bit sub-block is not related to the second check bit sub-block, the first post-coding bit sub-block and the second post-coding bit sub-block are used for generating the first radio signal and the second radio signal respectively;

or, the second processor receives a second radio signal in a second time window, the second time window is any time window out of M1 time window(s), the second radio signal carries the first bit block, wherein the M1 time window(s) is(are) a subset of the M time windows, the M1 is a positive integer less than the M, the second node receives (a) radio signal(s) carrying the first bit block only in the M1 time window(s) out of the M time windows.

18. The device in a second node according to claim 17, wherein the second processor transmits second information or receives second information; wherein the second information is used for determining at least one of the M and the M1.

19. The device in a second node according to claim 16, wherein if the first time window is a time window out of M2 time window(s), a first generation polynomial is used for generating the first check bit block, if the first time window is a time window out of M3 time window(s), a second generation polynomial is used for generating the first check bit block, the M2 time window(s) and the M3 time window(s) are two subsets of the M time windows not intersected with each other, the M2 and the M3 are positive integers less than the M, respectively.

20. The device in a second node according to claim 16, wherein the first check bit block comprises Q check bit sub-block(s), an information bit block corresponding to each check bit sub-block of the Q check bit sub-block(s) comprises the first bit block, the Q is a positive integer;

or, the second node is a base station or a UE;

or, the second processor receives repeatedly transmitted K radio signal group(s) in K time resource group(s) respectively, wherein any time resource group of the K time resource group(s) comprises a positive integer number of time window(s), any radio signal group of the K radio signal group(s) comprises a positive integer number of radio signal(s), the M time windows are a time resource group of the K time resource group(s), the K is a positive integer;

or, the second processor receives repeatedly transmitted K radio signal group(s) in K time resource group(s) respectively, and transmits first information or receives first information, wherein any time resource group of the K time resource group(s) comprises a positive integer number of time window(s), any radio signal group of the K radio signal group(s) comprises a positive integer number of radio signal(s), the M time windows are a time resource group of the K time resource group(s), the K is a positive integer, the first information is used for determining the K time resource group(s).

* * * * *